(12) United States Patent
Pamatmat

(10) Patent No.: US 10,105,764 B2
(45) Date of Patent: Oct. 23, 2018

(54) HOLE SAW MANDREL ASSEMBLY

(71) Applicant: Timothy Carl Pamatmat, Forestville, CA (US)

(72) Inventor: Timothy Carl Pamatmat, Forestville, CA (US)

( * ) Notice: Subject to any disclaimer, the term of this patent is extended or adjusted under 35 U.S.C. 154(b) by 0 days.

(21) Appl. No.: 15/633,532

(22) Filed: Jun. 26, 2017

(65) Prior Publication Data

US 2017/0291228 A1 Oct. 12, 2017

Related U.S. Application Data

(63) Continuation-in-part of application No. 14/070,236, filed on Nov. 1, 2013, now Pat. No. 9,687,917.

(60) Provisional application No. 61/796,251, filed on Nov. 4, 2012.

(51) Int. Cl.
*B23B 51/04* (2006.01)

(52) U.S. Cl.
CPC ...... *B23B 51/0473* (2013.01); *B23B 2251/02* (2013.01); *B23B 2260/136* (2013.01); *Y10T 408/953* (2015.01)

(58) Field of Classification Search
CPC ............ B23B 51/0473; B23B 2251/02; B23B 2251/60; B23B 2260/136; Y10T 408/953
See application file for complete search history.

(56) References Cited

U.S. PATENT DOCUMENTS

| | | | |
|---|---|---|---|
| 2,480,595 A * | 8/1949 | Moyer | B23B 51/0473 279/83 |
| 6,705,807 B1 * | 3/2004 | Rudolph | B23B 51/0426 279/143 |
| 2007/0160434 A1 * | 7/2007 | Gillissen | B23B 51/0426 408/68 |

* cited by examiner

*Primary Examiner* — Alan Snyder
(74) *Attorney, Agent, or Firm* — Howard Cohen

(57) ABSTRACT

A quick connect/disconnect mechanism for a rotary bit having a central mounting hole at a proximal end includes a shaft extending axially and having a proximal end adapted to be releasably secured in a rotary tool and a distal end having a spud extending distally and axially therefrom. A plurality of retainer arms are arrayed about the axis and extending distally, each retainer arm including a catch extending radially outwardly from a distal end thereof. A release sleeve extends about the shaft adjacent to said distal end, the release sleeve having engagement keys to impinge on the proximal ends of the retainer arms, the sleeve being rotatable from a first position in which the engagement keys hold the retainer arms to secure the rotary bit to a second position in which the retainer arms rotate to release the rotary bit.

9 Claims, 22 Drawing Sheets

HOLE SAW MANDREL ASSEMBLY

CROSS-REFERENCE TO RELATED APPLICATIONS

This application is a continuation-in-part of Ser. No. 14/070,236, filed Nov. 1, 2013, which is a continuation of Ser. No. 61/796,251, filed Nov. 4, 2012, from which filing date priority is claimed.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present disclosure relates to holesaws and, more particularly, a mandrel assembly for receiving holesaws.

BACKGROUND OF THE INVENTION

There are a variety of hole saw mandrel designs disclosing various quick release mechanism that exist in the art. These designs allow the user to "swap out" hole saw bits in a fraction of the time it would take with a traditional mandrel. However, the problem with these designs is they all require the user to attach a external quick disconnect member to every one of their hole saw bits. There are many disadvantages to this approach, first once the quick release members have been attached to the user's bits they will no longer fit in the case they came with. Second, the extra cost associated with these male members and the time required to attach them is a disadvantage. Finally, one of the primary reasons the user removes the saw bit is to remove the wooden plug, unfortunately the attached quick release members substantially obscures the hole typically used to push them out. Therefore, it would be advantageous if a quick release mandrel existed in the art that did not require the user to mount an external quick release member to their existing saw bits.

SUMMARY OF THE INVENTION

Accordingly, the present invention addresses this situation by providing a hole saw mandrel with integrated quick connect/disconnect saw bit retention means that does not require the use of a external quick release members.

Other advantages of the present invention will become apparent to those skilled in this art from the following description and drawings wherein there is described and shown a preferred embodiment of this invention in one of the best modes contemplated for carrying out the invention. As will be realized, the invention is capable of other modification in various, obvious aspects all without departing from the invention. Accordingly, the drawings and descriptions will be regarded as illustrative in nature and not as restrictive.

Other novel features characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

DETAILED DESCRIPTION OF THE INVENTION

Figure 1:
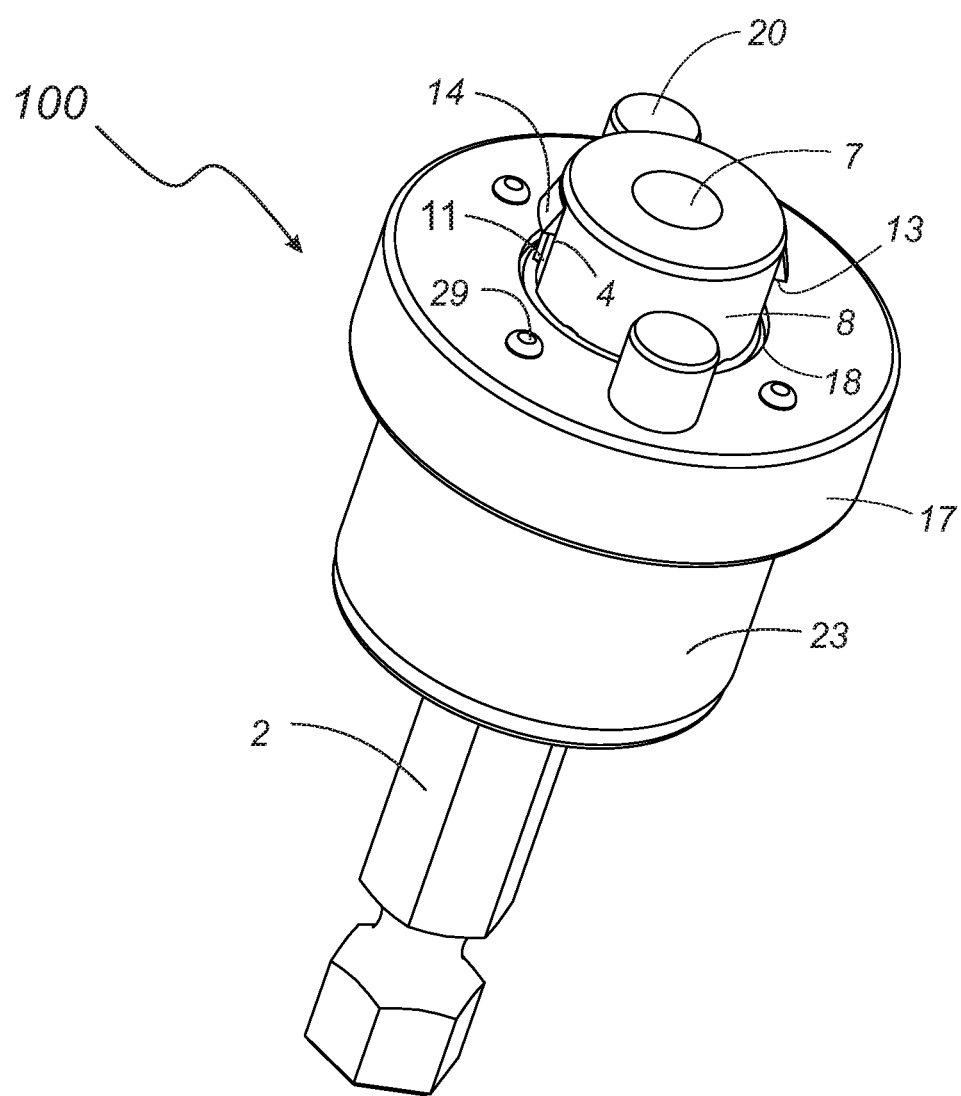
FIG. 1 is a perspective view of embodiment 100 of the present invention.
Figure 2:
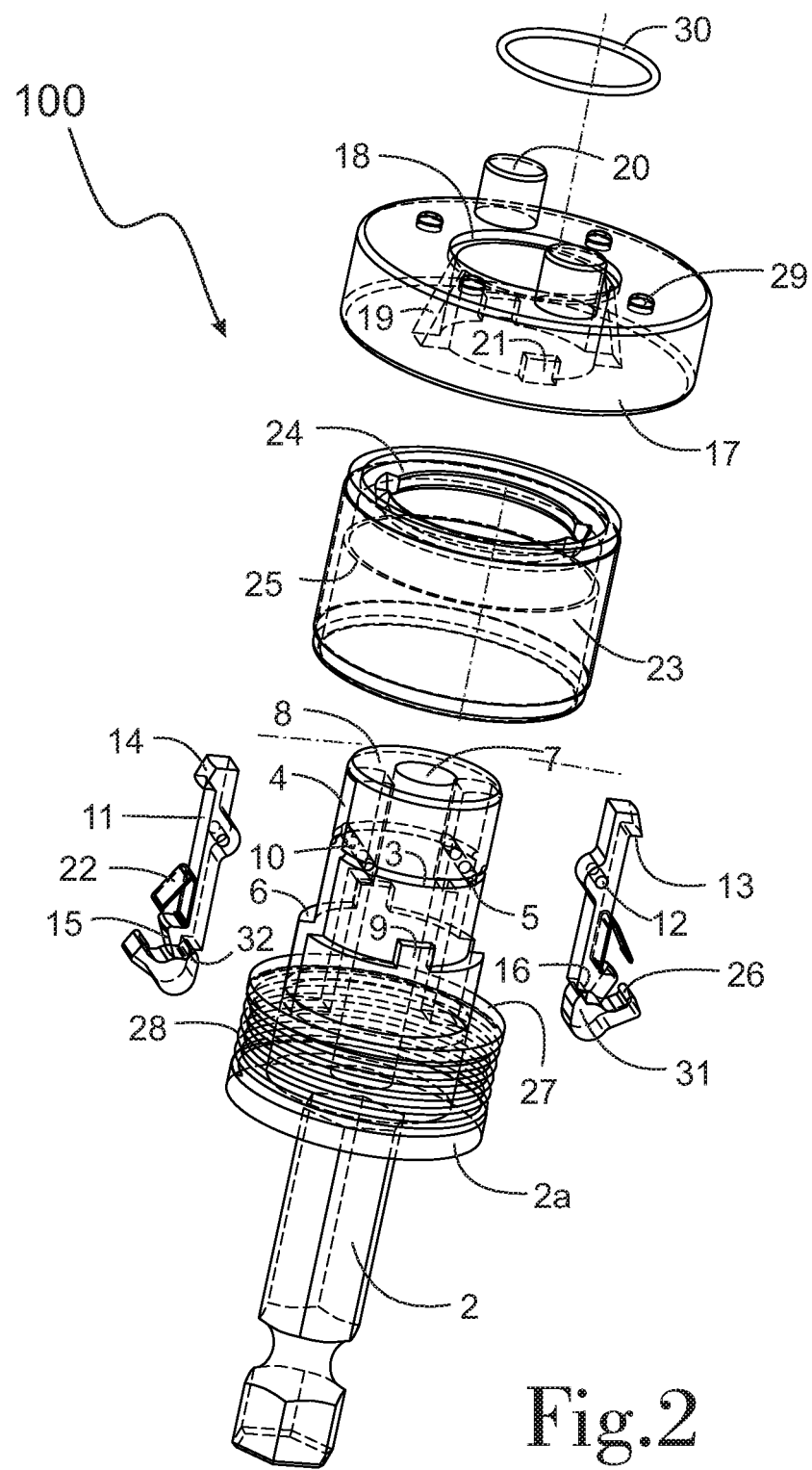
FIG. 2 is an exploded view of embodiment 100 of the present invention.

FIGS. 1-2 illustrates embodiment 100 of the present invention comprising of a main shaft 2 where a spring support 2a, a hog ring groove 3, a set of retainer arm recesses 4, a pair of axel aperture 5, a upper support land 6, a pilot bit recess 7, a spud 8 and a set of keys 9 are all elements of main shaft 2, a set of axels 10 which are positioned concentrically within axel apertures 5, a set of retainer arms 11 where a axel aperture 12, a catch 13, a ramped surface 14, a stop ring interface 15, and a lever interface 16 are all elements of retainer arms 11 and where retainer arms 11 are positioned within recesses 4 and pivotably connected to axel 10, a upper support 17 where a hog ring recess 18, a set of spring recesses 19, a pair of engagement pins 20 and a set of keyways 21 are all elements of upper support 17 and where upper support 17 is concentrically positioned about shaft 2 such that the underside of support 17 is in contact with land 6 and keys 9 are engaged with keyways 21 such that rotation of support 17 relative to shaft 2 is substantially restricted, a set of return springs 22 positioned within spring recesses 19 where the spring force is constantly urging the lower section of arms 11 against shaft 2, a release sleeve 23 where a stop ring 24 and a washer land 25 are all elements of release sleeve 23 and where sleeve 23 is positioned concentrically about shaft 2, a set of lever arms 31 where a retainer arm interface 32 and a stop ring interface 26 are all elements of lever arms 31 and where lever arms 31 are positioned within recesses 4 such that interface 32 interacts with interface 16 and interface 26 interacts with the underside of stop ring 24, a washer 27 positioned concentrically about shaft 2 such that the upper side of washer 27 interacts with washer land 25, a return spring 28 positioned such that it is contact with spring support 2a and washer 27 where the spring force is constantly urging sleeve 23 against upper support 17, a hog ring 30 that interacts with groove 3 and recess 18 such that in conjunction with land 6 support 17 is substantially rigidly connected to shaft 2 and a set of rubber bumpers 29 positioned concentrically about shaft 2 and located on the upper side of support 17.

Figure 3:
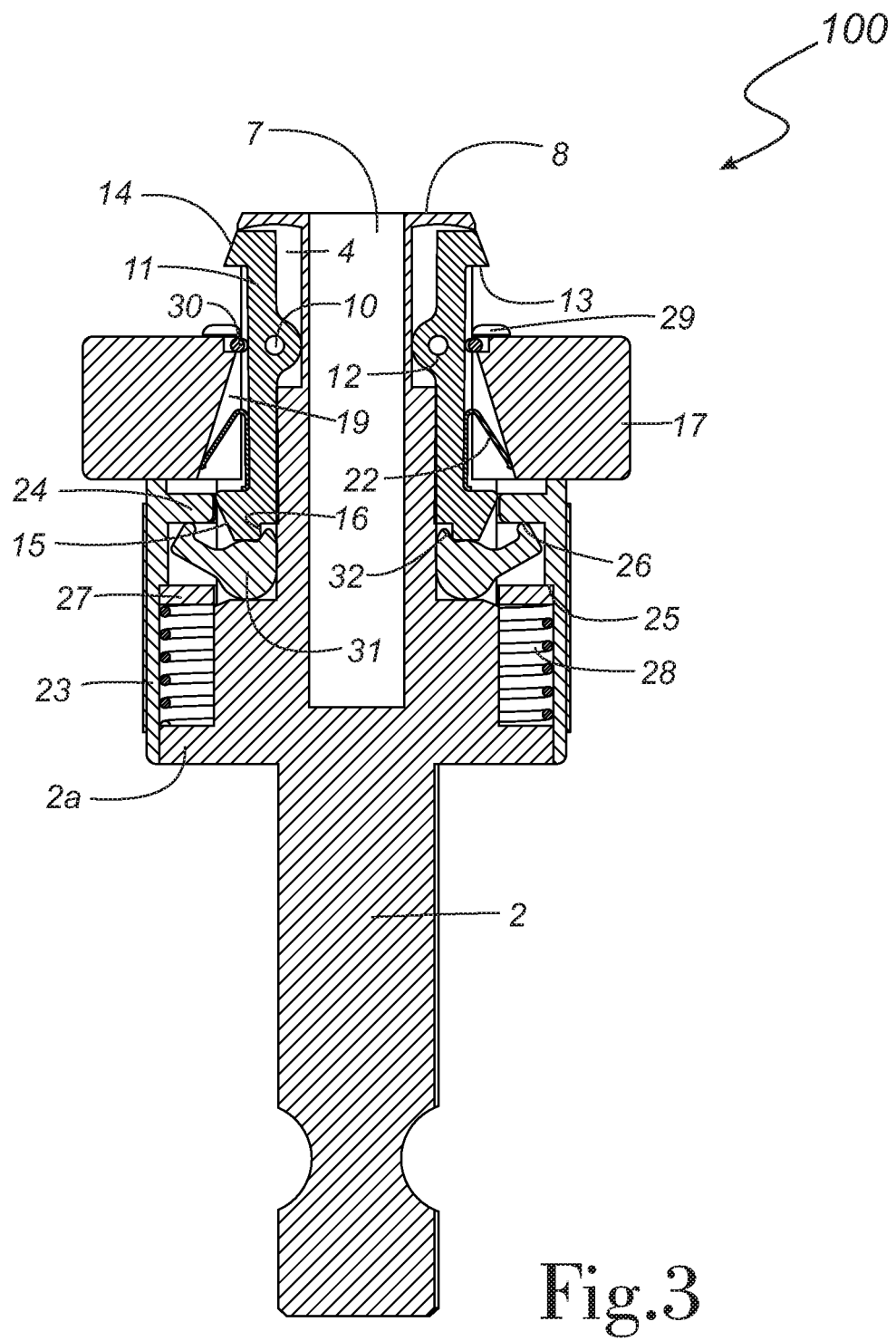
FIG. 3 is a sectional view of embodiment 100 of the present invention.
Figure 4:
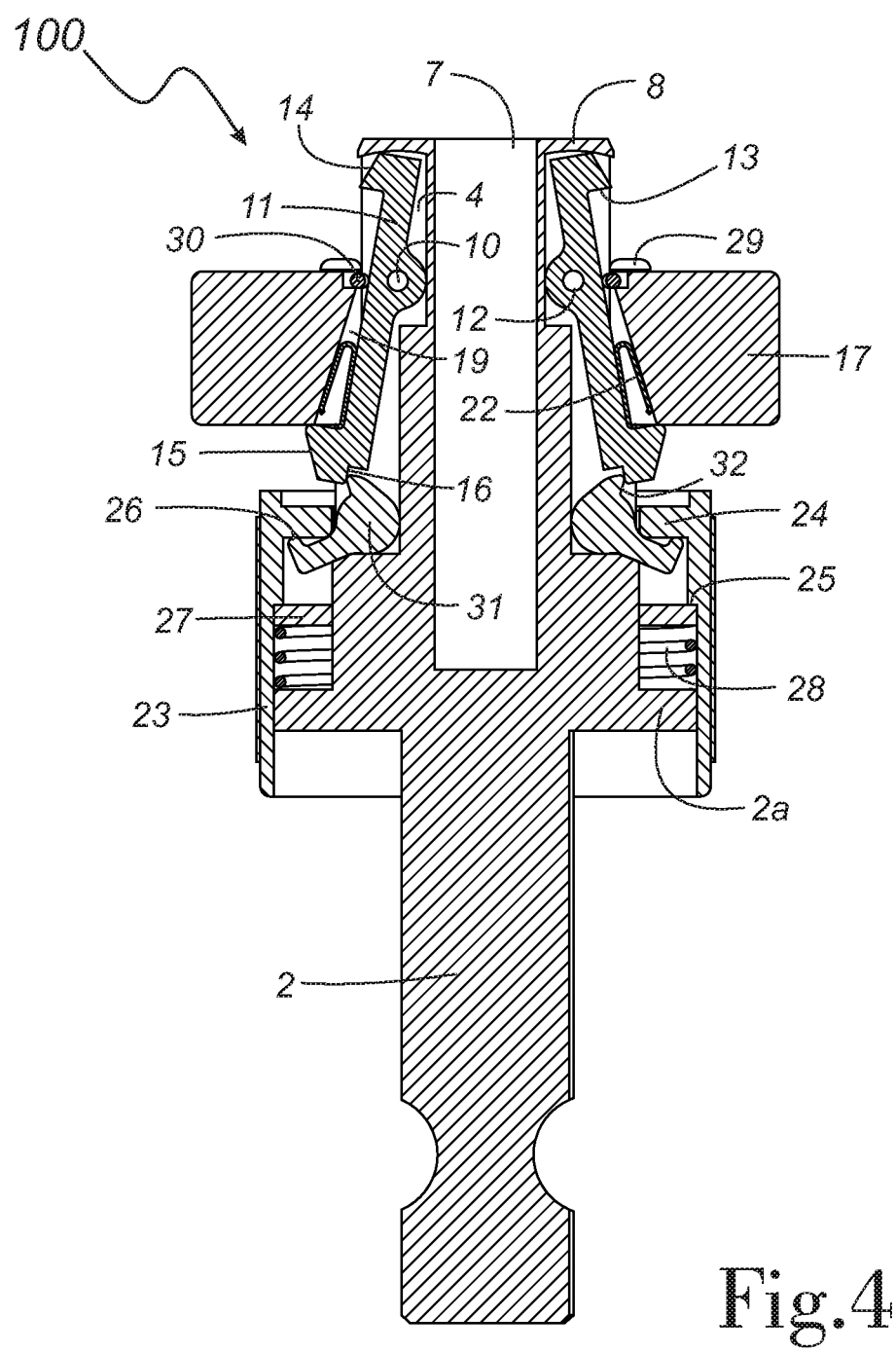
FIG. 4 is a sectional view of embodiment 100 of the present invention.
Figure 5:
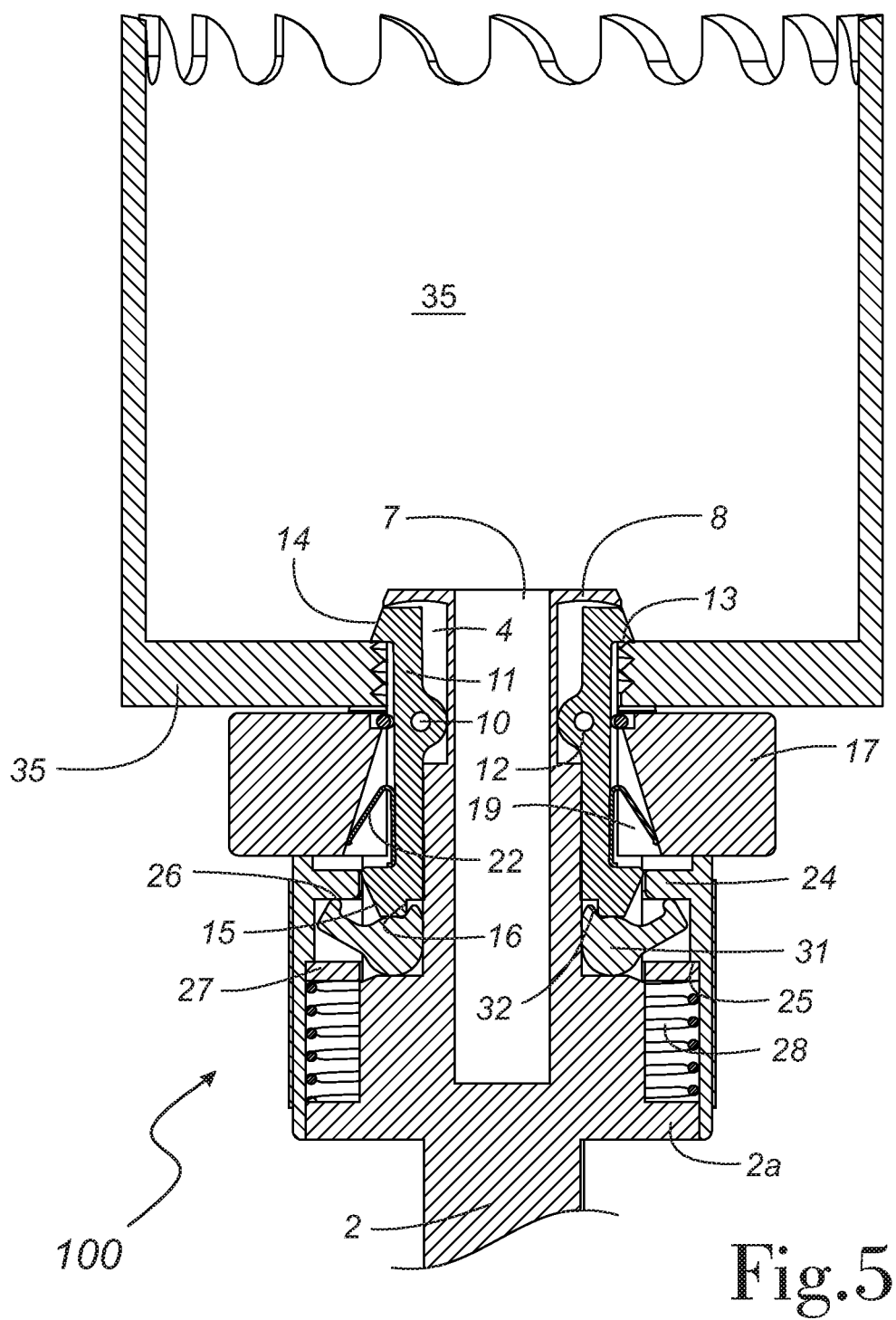
FIG. 5 is a sectional view of embodiment 100 of the present invention.

FIG. 3-5 is a sequence of views that illustrate the present invention in operation. In FIG. 3 embodiment 100 is in the starting position where return springs 22 are forcing the lower section (section below arms 11 pivot point) of retainer arms 11 against shaft 2. Note that retainer arms 11 are locked in the position shown as shaft 2 restricts rotation in one direction and the interaction of stop ring 24 with interface 15 restricts rotation in the other direction. Also, in the absence of an external force acting on sleeve 23, stop ring 24 will remain in the position shown (restricting retainer arms 11 rotation) as spring 28 is urging release sleeve 23 against upper support 17. In FIG. 4 the user has pulled release sleeve 23 downward and as a result, the interaction between interface 26 with stop ring 24 has caused lever arms 31 to rotate. This rotation of lever arms 31 in turn rotates retainer arms 11 due to the interaction of interface 32 on lever arms 31 with interface 16 on retainer arms 11. The user is now able to mount a saw bit 35 (now possible as catch 13 is no longer protruding past the surface of spud 8) by positioning spud 8 within the central hole located on saw bit 35 and then rotating (while applying slight downward pressure) saw bit 35 until the pair of engagement pin holes on saw bit 35 align with engagement pins 20 at which point saw bit 35 will slide further down spud 8 until the rear surface of bit 35 comes into contact with and slightly compresses rubber bumpers 29. The user then releases sleeve 23 where springs 22/28 will return the assembly to the initial position as shown in FIG. 5 where now catch 13 on lever arms 11 retain bit 35 in the position shown. In order to remove bit 35, the user will again pulls down on sleeve 23 where as discussed before, the assembly will return to the position shown in FIG. 4 allowing bit 35 to be removed. It should be noted that rubber bumpers 29 are not essential to the design as bit 35 would still be retained in their absence. The purpose of bumpers 29 is to provide the assembly with a predetermined amount of compliance such that saw bits with varying thicknesses of back plates from different manufactures would not have any excessive play (rattle) when mounted to the present invention. This function could be provided for by other obvious means such as a pin and spring combination, a spring positioned concentrically about spud 8, elastomeric washers, elastomeric 0-rings, etc.

There are many other means of rotating the lever arms disclosed above. For example, if the retainer arms 11 pivot point were moved to a point below stop ring 24, a simple ramped surface placed on arms 11 could interact with stop ring 24 to rotate the lever arms radially inward when the outer sleeve is pulled downward. In general there are numerous mechanism known in the art that could be used to move/rotate a set of retainer arms.

Figure 6:
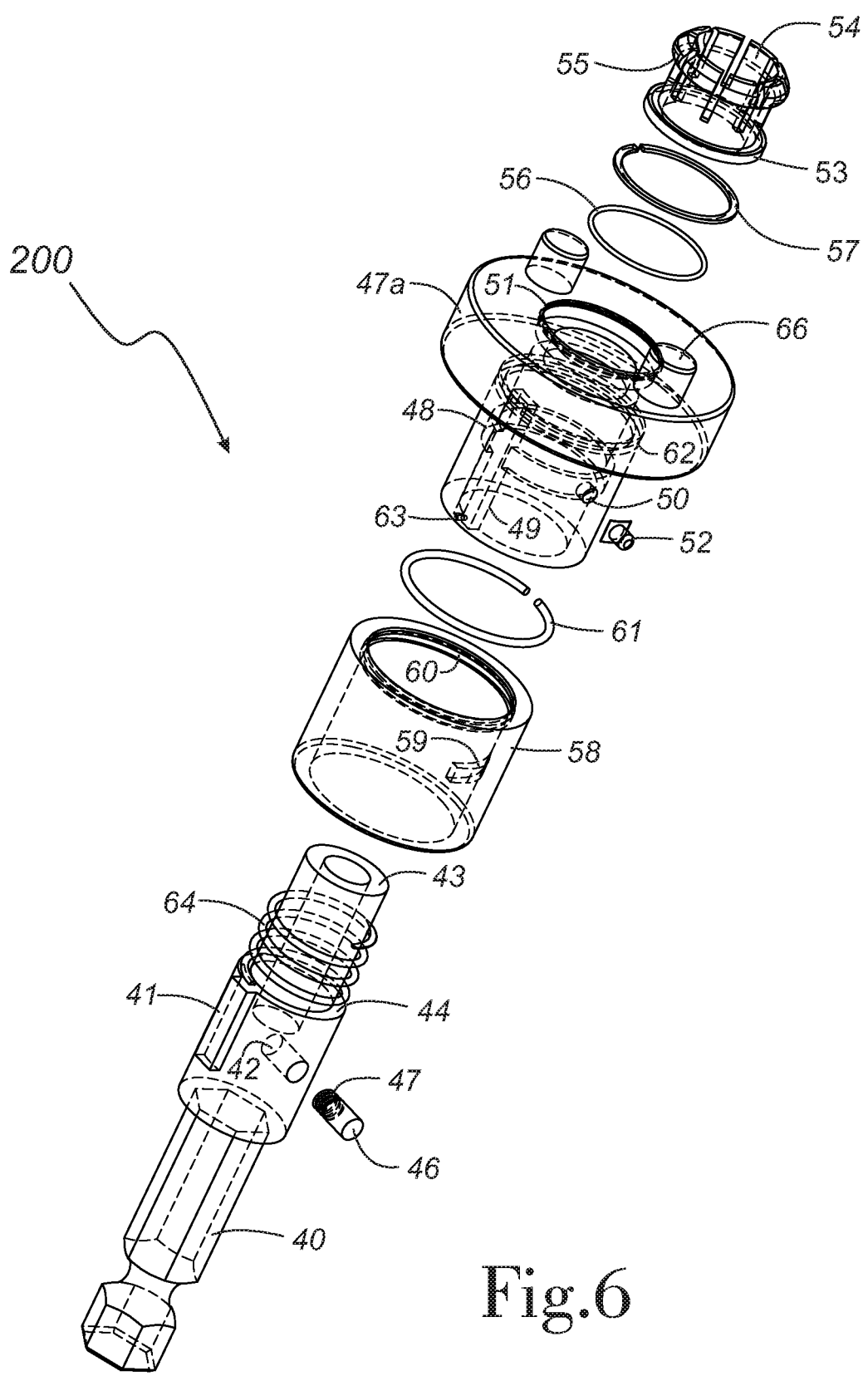
FIG. 6 is an exploded view of embodiment 200 of the present invention.
Figure 7:
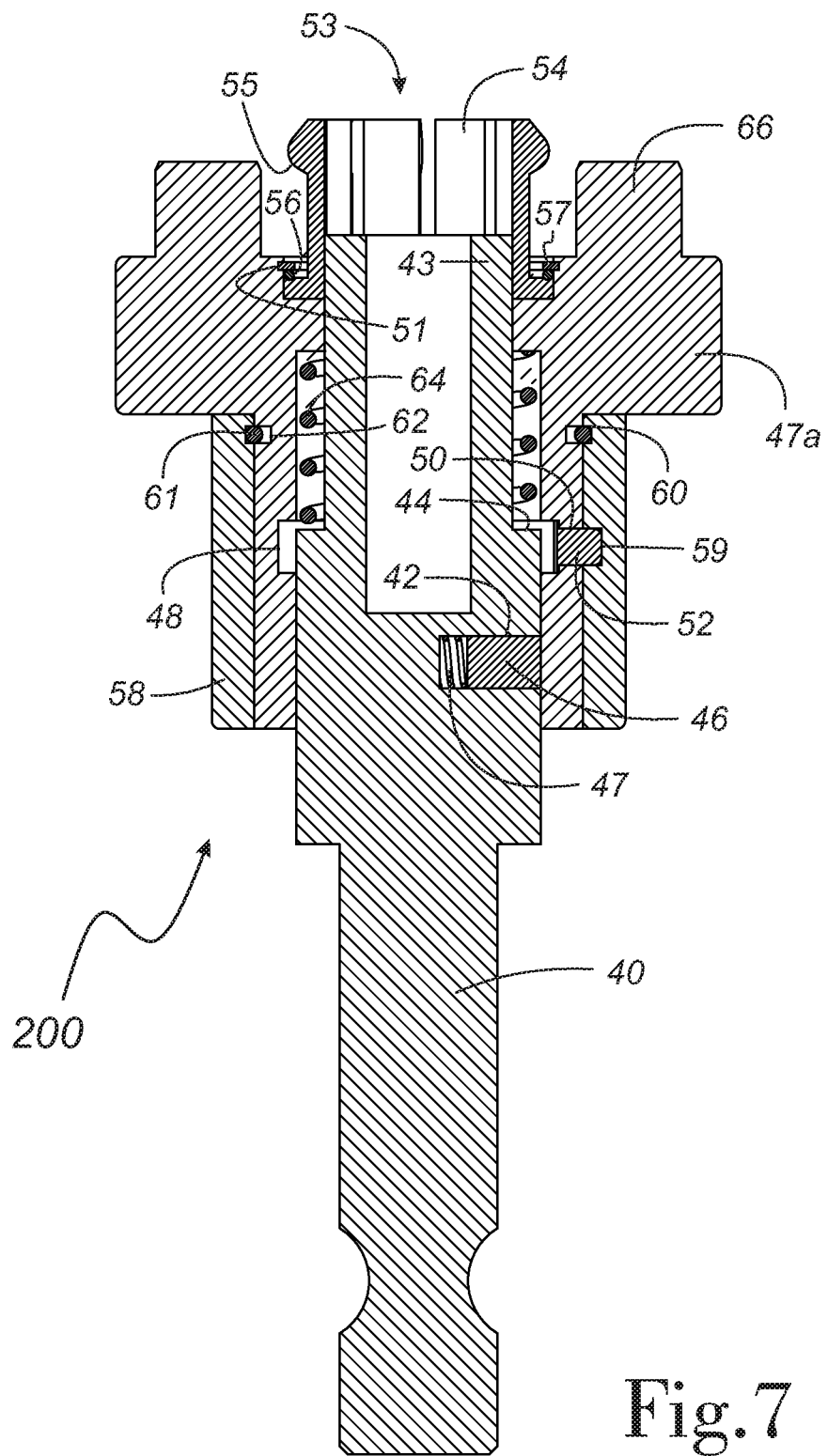
FIG. 7 is a sectional view of embodiment 200 of the present invention.
Figure 8:
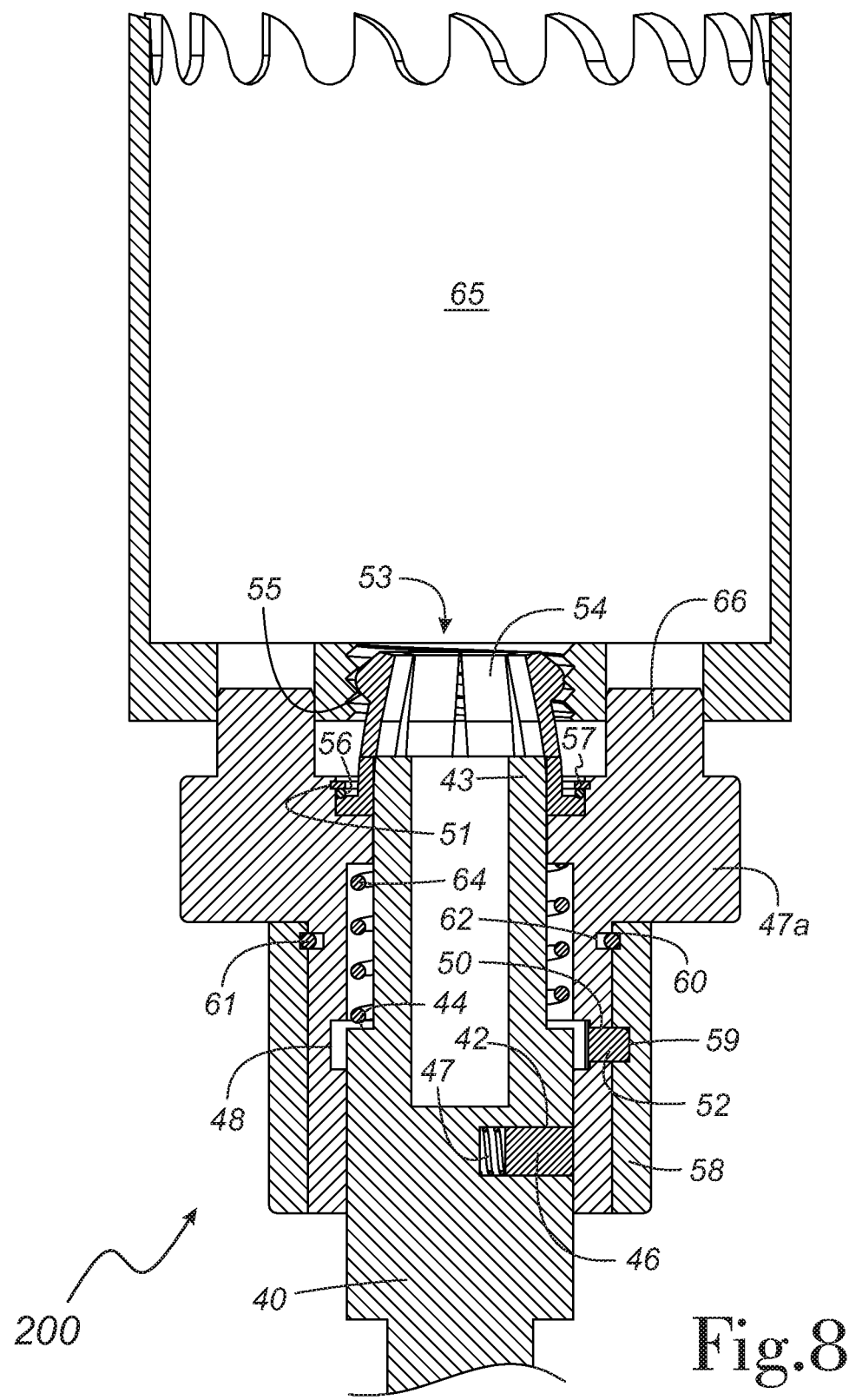
FIG. 8 is a sectional view of embodiment 200 of the present invention.

FIG. 6 illustrate embodiment 200 of the present invention where the primary difference from embodiment 100 is the use of a set of retainer arms connected at their base that slide rearward to provide the saw bit retention means. In detail embodiment 200 comprises a main shaft 40 where a key 41, a catch aperture 42, a spud 43 and a spring land 44 are all features of shaft 40, a catch pin 46, a catch pin spring 47 positioned concentrically within aperture 42 such that one end abuts main shaft 40 and the other abuts catch pin 46 such that it urges pin 46 radially outward, a upper support 47a where a catch groove 48 that interacts with catch pin 46 such that when pin 46 is engaged with groove 48 upper support 47a is unable to move in the axial direction relative to shaft 40, a keyway 49 that interacts with key 41 such that movement of upper support 47a relative to shaft 40 is substantially limited to the axial direction of shaft 40, a release button aperture 50, a circlip groove 51, a groove 62, and a pair of engagement pins 66 are all features of upper support 47a, a release button 52 that is positioned concentrically within release button aperture 50 and intermittently interacts with catch pin 46 such that when catch pin 46 is engaged with catch groove 48, pressing release button 50 radially inward disengages catch pin 46 from catch groove 48, a collet 53 where a set of retainer arms 54, and a set of catches 55 are all features of collet 53, a 0-ring 56, a circlip 57 that retains collet 53, a release sleeve 58 where a release ramp 59 that interacts with release button 50, and a groove 60 are all features of release sleeve 58, a hog ring 61 that interacts with groove 60 and groove 62 such that movement of release sleeve 58 relative to upper support 47a is substantially limited to rotation, a stop pin 63 rigidly fixed to upper support 47a that interacts with key 41 to limit the movement of support 47a relative to shaft 40 and a main spring 64 positioned concentrically about shaft 40 such that one end is in contact with spring land 44 while the other end contacts upper support 47a.

Figure 9:
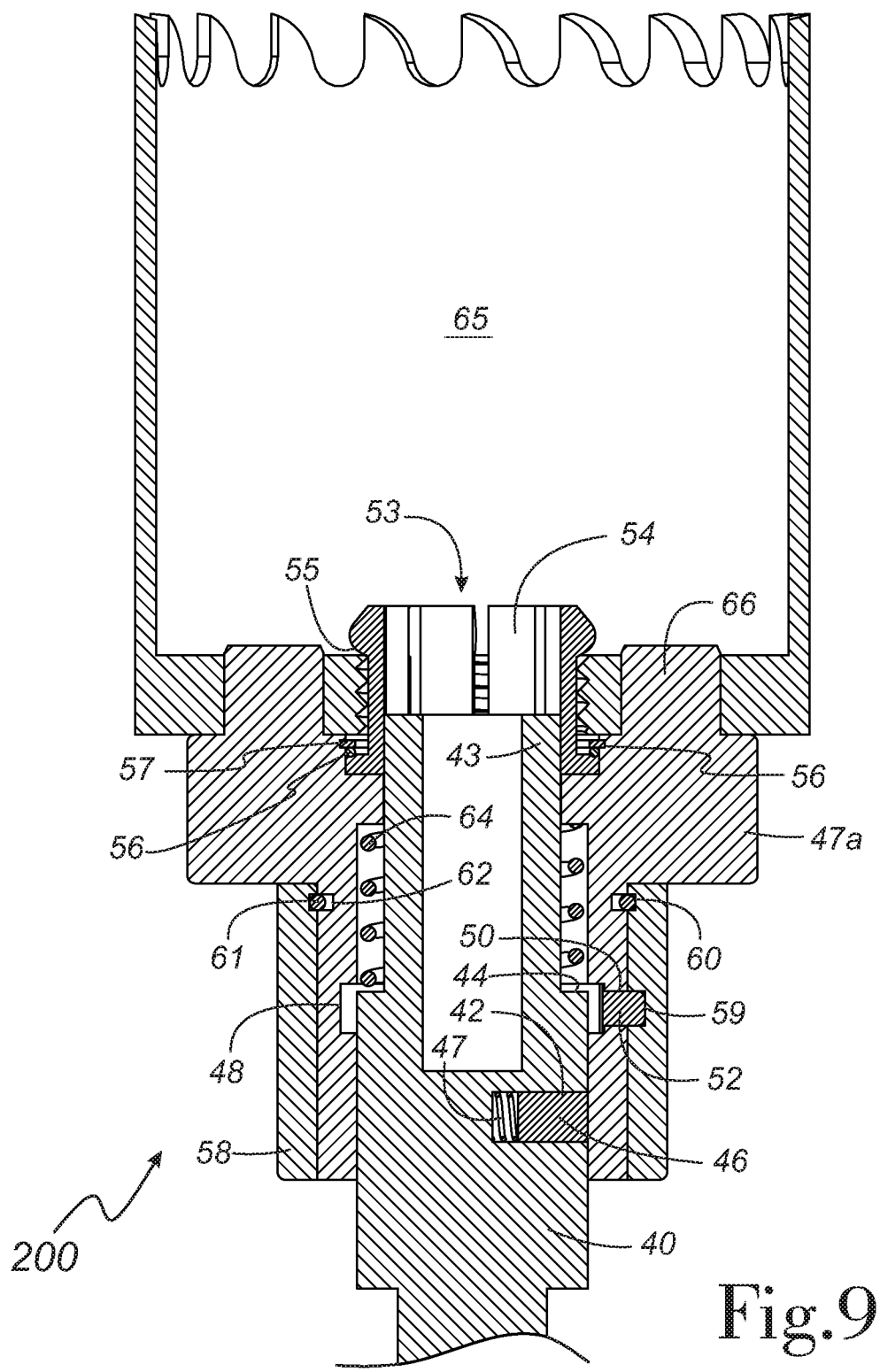
FIG. 9 is a sectional view of embodiment 200 of the present invention.
Figure 10:
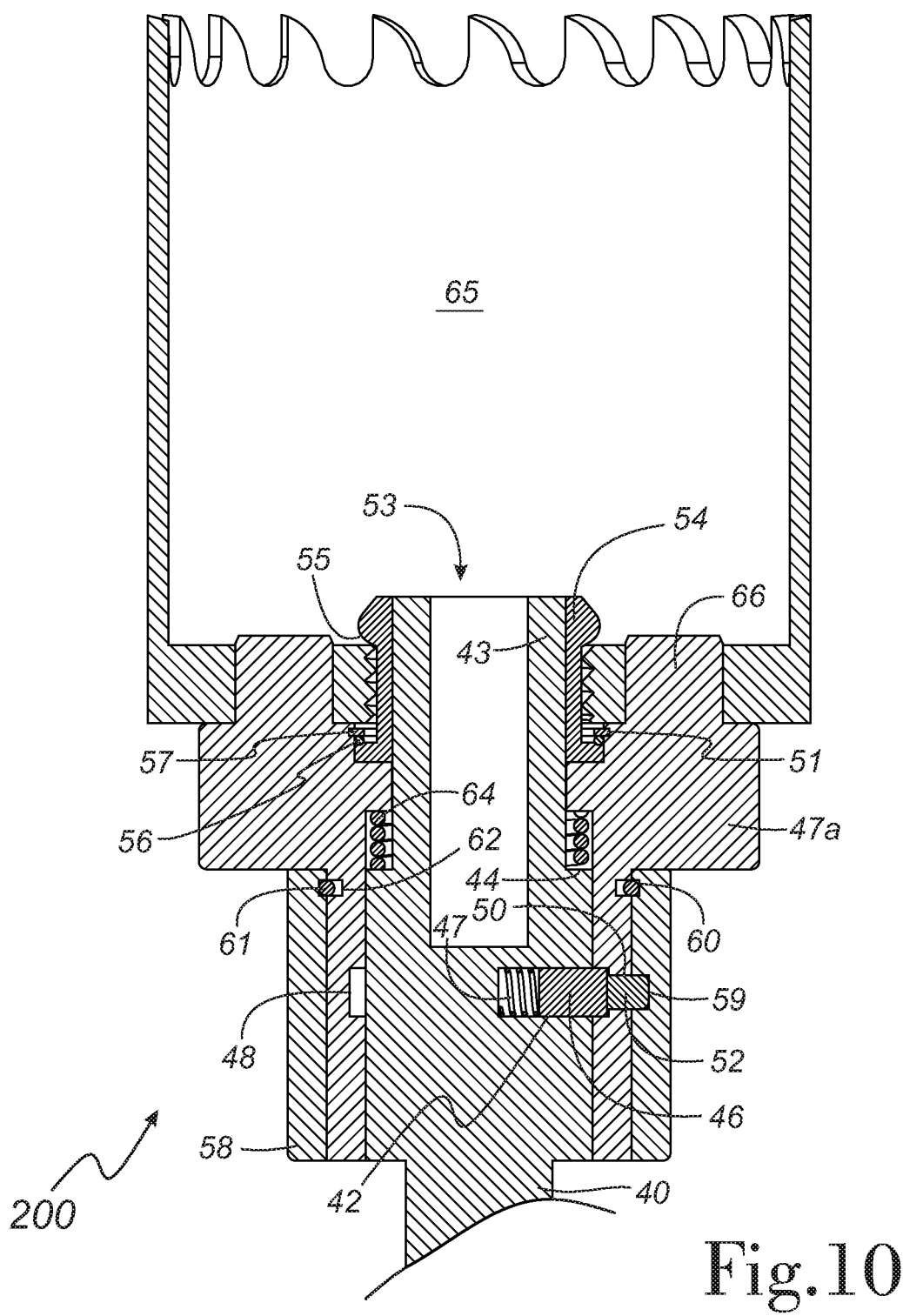
FIG. 10 is a sectional view of embodiment 200 of the present invention.

FIG. 7-10 is a sequence of views that illustrates embodiment 200 of the present invention in operation. Starting with FIG. 7 embodiment 200 is in the starting position where main spring 64 has urged upper support 47a into the forward position shown. Note that since spud 43 is only partially inserted into collet 53, retainer arms 54 are able to bend radially inward. It would also be possible to configure collet 53 such that retainer arms 54 were, to some degree, preformed such that they are bent radially inward in the position shown (as in FIG. 8). Now focusing on FIG. 8, the user is mounting saw bit 65 by aligning the center aperture of bit 65 with collet 53 and applying downward pressure while at the same time rotating bit 65 until engagement pins 66 align with their matching apertures on bit 65. As shown, this downward force in conjunction with the interaction of the ramped section of catches 55 with the edge of the saw bit 65 center aperture has bent the retainer arms 54 radially inward as shown. In FIG. 9, the user has continued to apply downward pressure resulting in the position shown where the retainer arms 54 are fully inserted in bit 65 and the back of bit 65 is in contact with upper support 47a. In FIG. 10 the user has continued to apply downward pressure, forcing upper support 47a downward relative to shaft 40 to the point where catch pin 46 is engaged with catch groove 48. The user may now release saw bit 65 as the assembly will remain in the position shown until catch pin 46 is disengaged. In addition, since spud 43 is fully inserted into collet 53, retainer arms 54 are no longer able to bend radially inward where catches 55 will retain saw bit 65 in the position shown. To remove saw bit 65, the user rotates release sleeve 58 where due to the interaction between ramp 59/button 52, release button 52 is pressed radially inward. This disengages catch pin 46 from groove 48, allowing spring 64 to return the assembly into the position shown in FIG. 8 where the saw bit 65 may be removed. It should be noted that it would be possible to configure embodiment 200 such that the user interacts with release button 52 directly, in which case release sleeve 58 would no longer be needed. In general release sleeve 58 is a convenience feature as it removes the need to hunt for or find release button 52. Main spring 64 is a convenience feature as well as it only serves to minimize user interaction with the assembly in the engagement/disengagement process (the user does not have to physically move upper support 47a), where its absence would result in obvious changes in this engagement/disengagement process. Finally, another non-essential element is O-ring 56 which only serves to provide compliance such that saw bits with varying thicknesses of back plates will mount onto embodiment 200 without any excessive play which can result in a rattling sound that could possibly annoy the user. This function could be provided for in many other different ways as discussed in embodiment 100.

Figure 11:
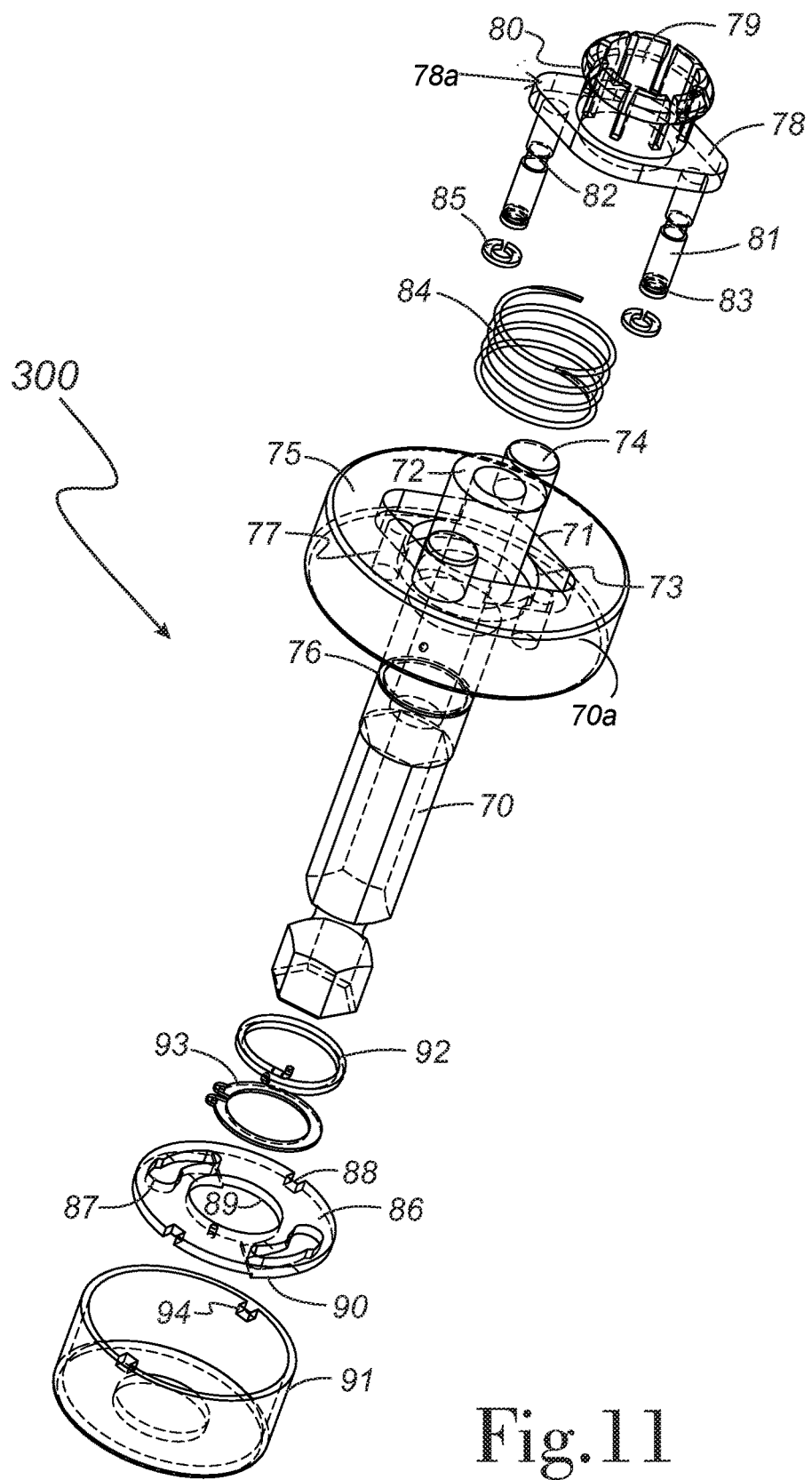
FIG. 11 is an exploded view of embodiment 300 of the present invention.

FIG. 11 illustrate embodiment 300 of the present invention, where the primary difference from embodiment 200 is that the saw bit retention member is the only member that slides forward in the disengaged position. Another difference is the use of a rotating member to lock the saw bit retention member in the engaged/rearward position. In detail, embodiment 300 comprises main shaft 70 where a collet recess 71, a spud 72, a spring recess 73, a pair of engagement pins 74, a upper support surface 75, a circlip groove 76 and a set of retainer shaft apertures 77 are all elements of main shaft 70, a collet 78 where a set of retainer arms 79, a set of catches 80 positioned at the proximal end of arms 79, a set of retainer shafts 81 that slidably interact with apertures 77, a set of retainer grooves 82 and a set of stop washer grooves 83 are all elements of collet 78, a main spring 84 positioned concentrically about spud 72 such that one end is in contact with spring recess 73 and the other against collet 78 where the spring force is urging collet 78 away from shaft 70, a set of stop washers 85 that interact with grooves 83 and serve to limit the movement of collet 78, a locking plate 86 where a set of keyholes 87 that interact with shafts 81 and grooves 82 such that when the narrow section of keyholes 87 are engaged with grooves 82 collet 78 is held substantially fixed relative to shaft 70, a set of notches 88, a center aperture 89 and a set of ramped surfaces 90 are all elements of locking plate 86, a release sleeve 91, where a set keys 94 that interact with notches 88 such that sleeve 91 is unable to rotate relative to locking plate 86 is an element of release sleeve 91, a torsional return spring 92 positioned concentrically about shaft 70 such that one end is fixed to locking plate 86 and the other fixed to shaft 70 where the spring force is urging locking plate 86 into the engaged position (narrow section of keyholes 87 engaged with groove 82) and a circlip 93 that interacts with circlip groove 76 that retains the position of release sleeve 91 relative to shaft 70.

Figure 12:
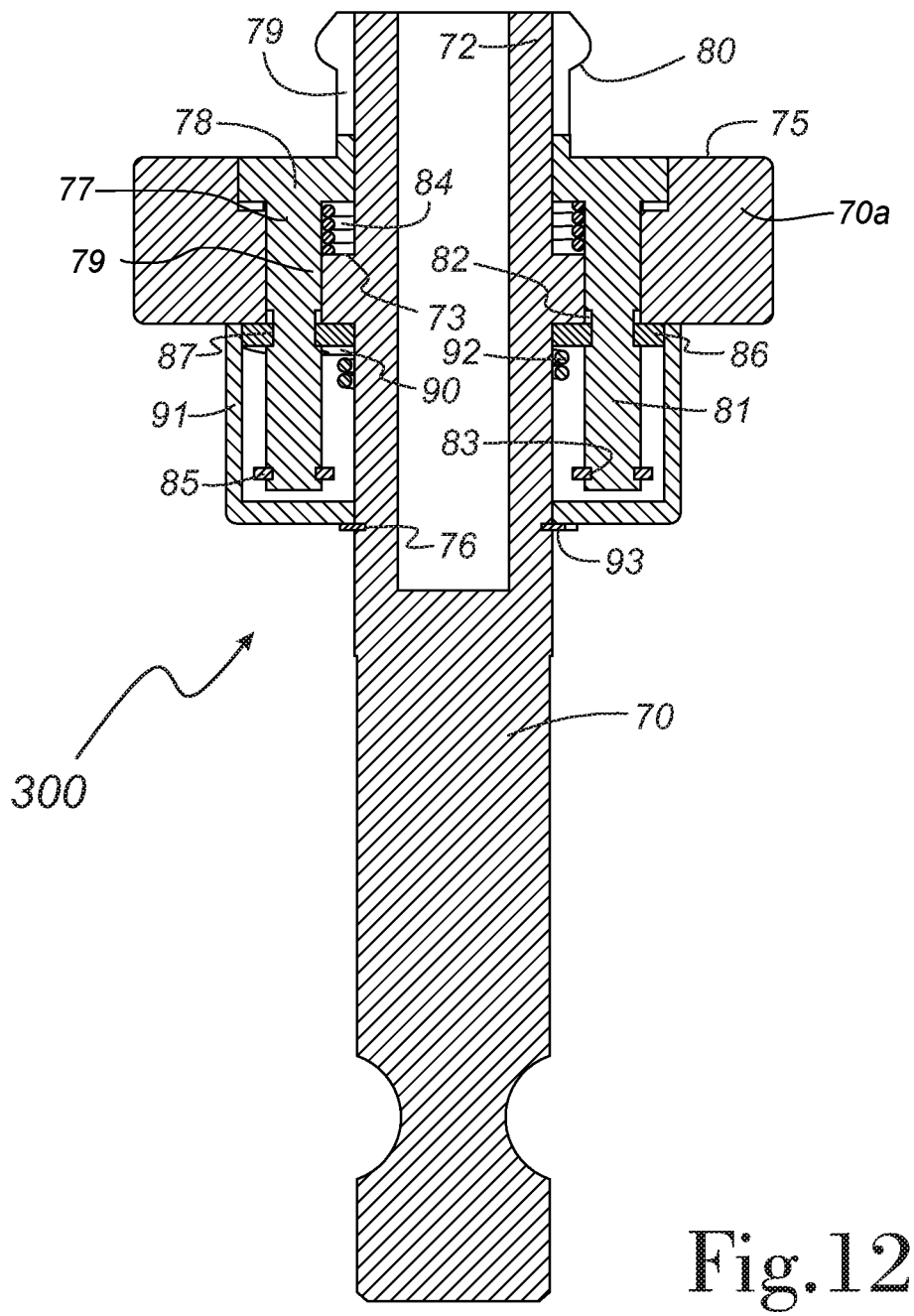
FIG. 12 is a sectional view of embodiment 300 of the present invention.
Figure 13:
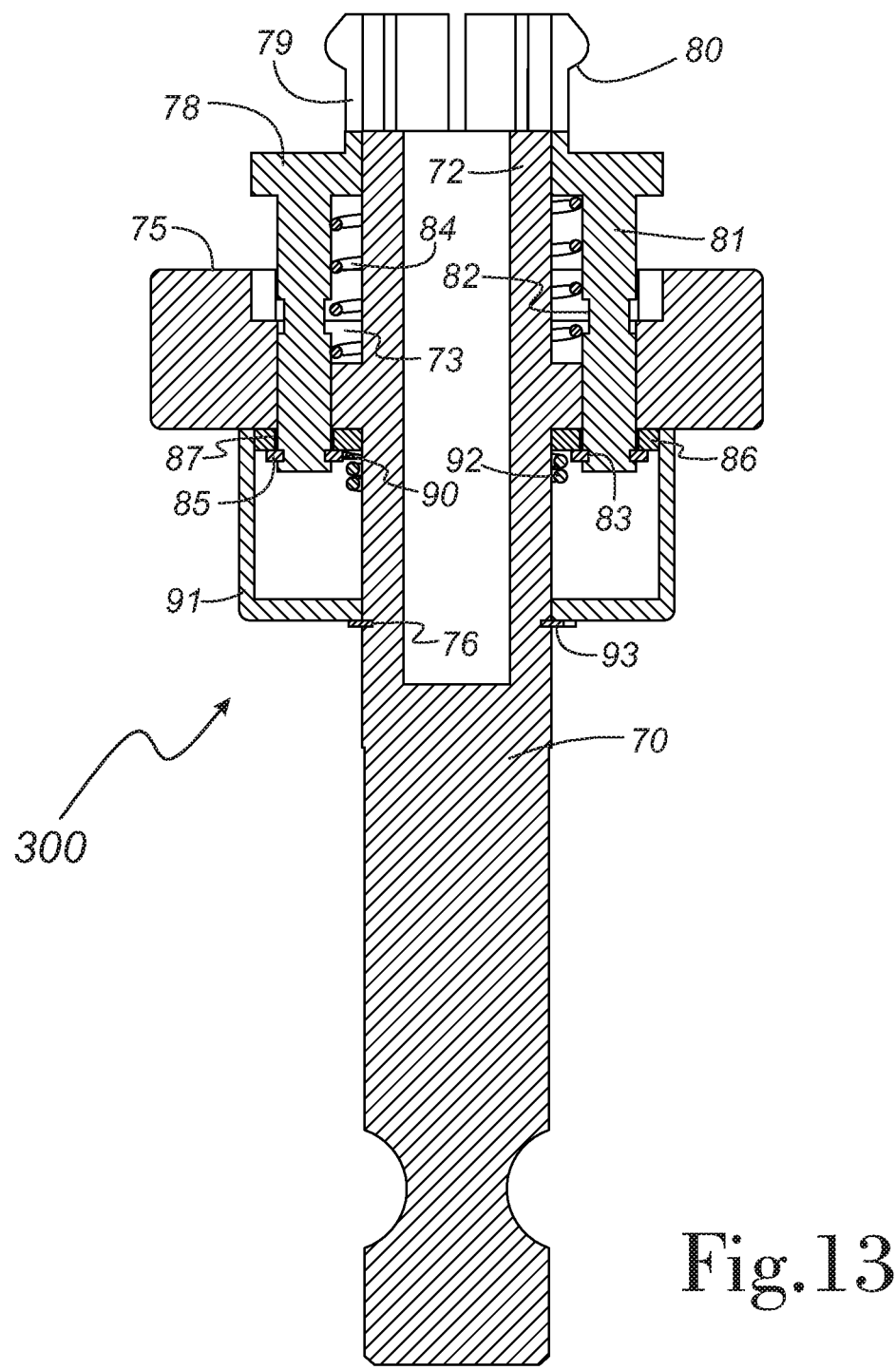
FIG. 13 is a sectional view of embodiment 300 of the present invention.

FIG. 12-13 illustrate embodiment 300 of the present invention in operation. Due to the similarities between embodiment 200 and embodiment 300 a full set of operational figures are not required as many steps are obviously similar. Starting with FIG. 12 embodiment 300 is restrained in the starting position as the narrow section of keyholes 87 is engaged with grooves 82 on shafts 81. In FIG. 13, release sleeve 91 has been rotated which in turn has rotated locking plate 86 due to the interaction of keys 94 with notches 88. As a result, the narrow section of keyholes 87 have been rotated away from and disengaged with grooves 82 allowing spring 84 to urge collet 78 into the forward position as shown. At this point and similar to the situation in FIG. 8-9 of embodiment 200, the user is able to mount the saw bit onto collet 78 where further downward pressure will again align grooves 82 with keyholes 87. This alignment will then allow spring 92 to rotate locking plate 86 such that the narrow section of keyholes 87 is re-engaged with grooves 82 returning the assembly to the position shown in FIG. 12. The ramped surface 90 surrounding the narrow section of keyholes 87 is an optional feature that utilizes a simple wedge mechanism to draw collet 78 further downward during engagement of the narrow section of keyholes 87 with grooves 82 such that any excessive play between upper support surface 75 and the saw bit is substantially minimized.

Figure 14:
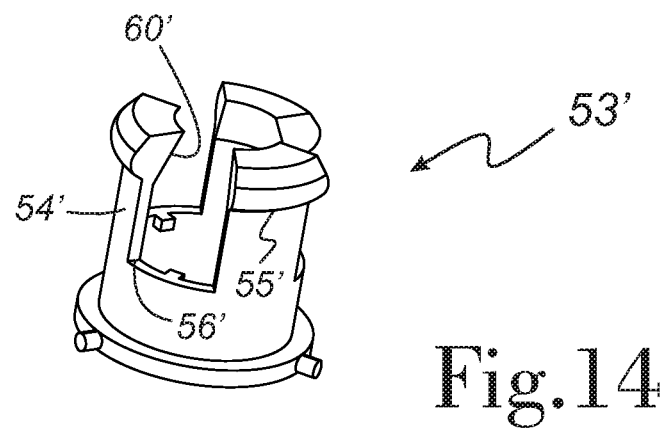
FIG. 14 is a perspective view of collet 53' of the present invention.
Figure 15:
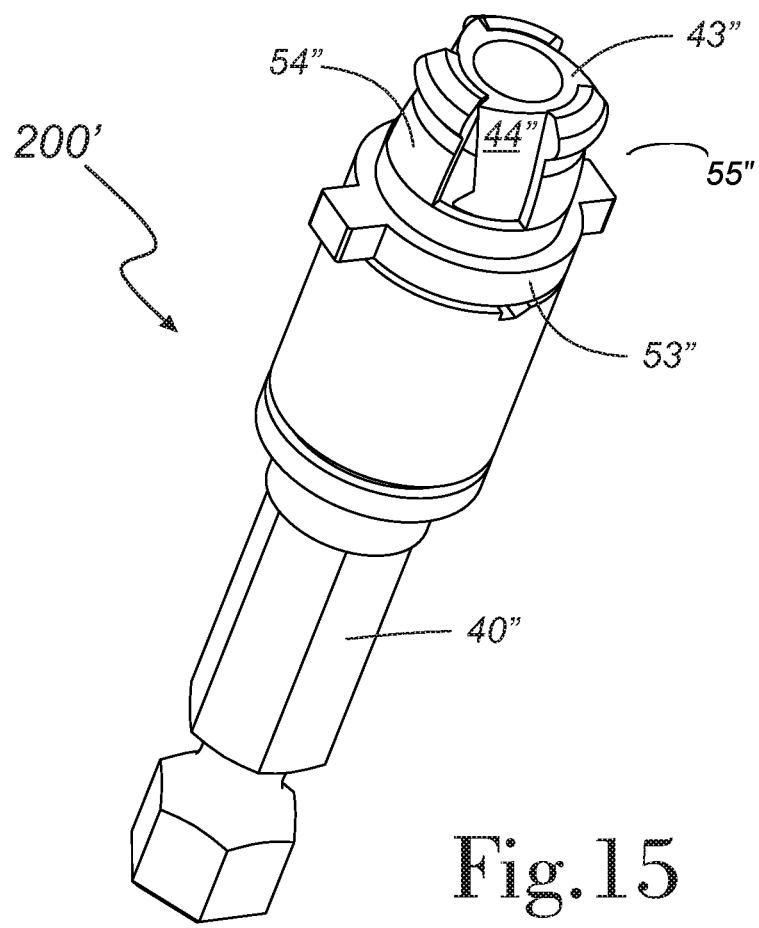
FIG. 15 is a perspective view of assembly 200' of the present invention.

FIG. 14-15 illustrates an alternative collet and spud configurations. In FIG. 14 collet 53' is comprised of a set of retainer arms 54', a set of catches 55' located at the end of arms 54' and a set of rear protruding interfaces 60' located opposite catches 55'. The difference interface 60' provides is that when matched with a spud that comprises a depressions of a similar shape such as a chamfer, the distance collet 53' must travel before retainer arms 54' are allowed to bend fully inward is minimized. Specifically, the base of retainer arms 54' at 56' need only travel to the proximal edge of the spud depression to allow for full radially inward movement as opposed to the distal edge or tip of the spud as in previous collet embodiments. Of course if collet 53' were used with a spud without a similar depression as in previous embodiments, the interaction of interface 60' with the distal end of the spud would expand retainer arms 54' radially outward as collet 53' is drawn downward around the spud. FIG. 15 illustrates an alternative collet and spud assembly 200' comprising of a main shaft 40" where a spud 43" and ramped interfaces 44" are elements of main shaft 40" and a collet 53" that further comprises a set of retainer arms 54" and rotating keys 55". The difference between previous embodiments is that rotational as opposed to downward movement of collet 53" provides the saw bit retention means. Specifically, the interaction of arms 54" with interfaces 44" as collet 53" is rotated expands arms 54" outward.

Figure 16:
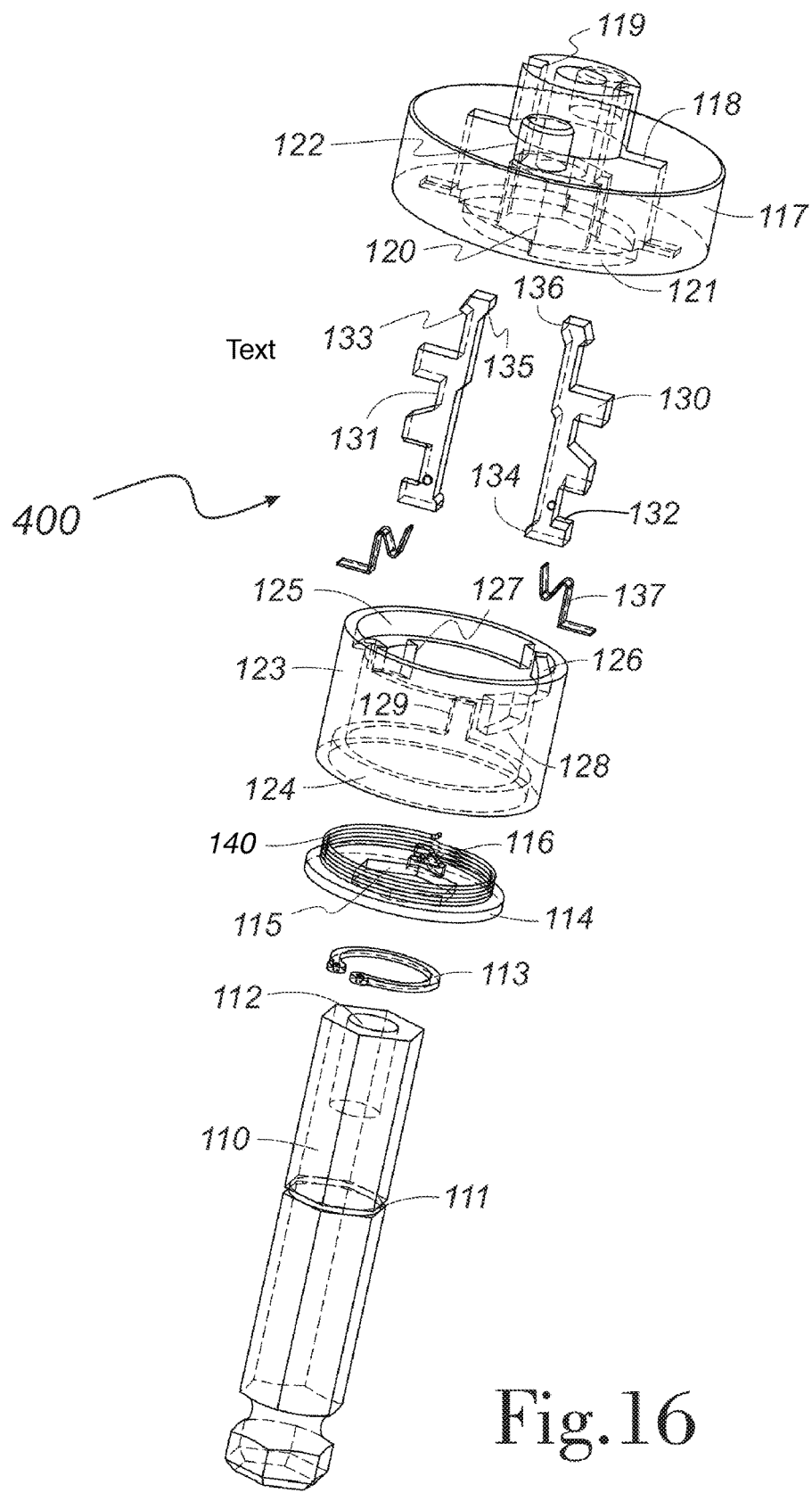
FIG. 16 is an exploded view of embodiment 400 of the present invention.
Figure 17:
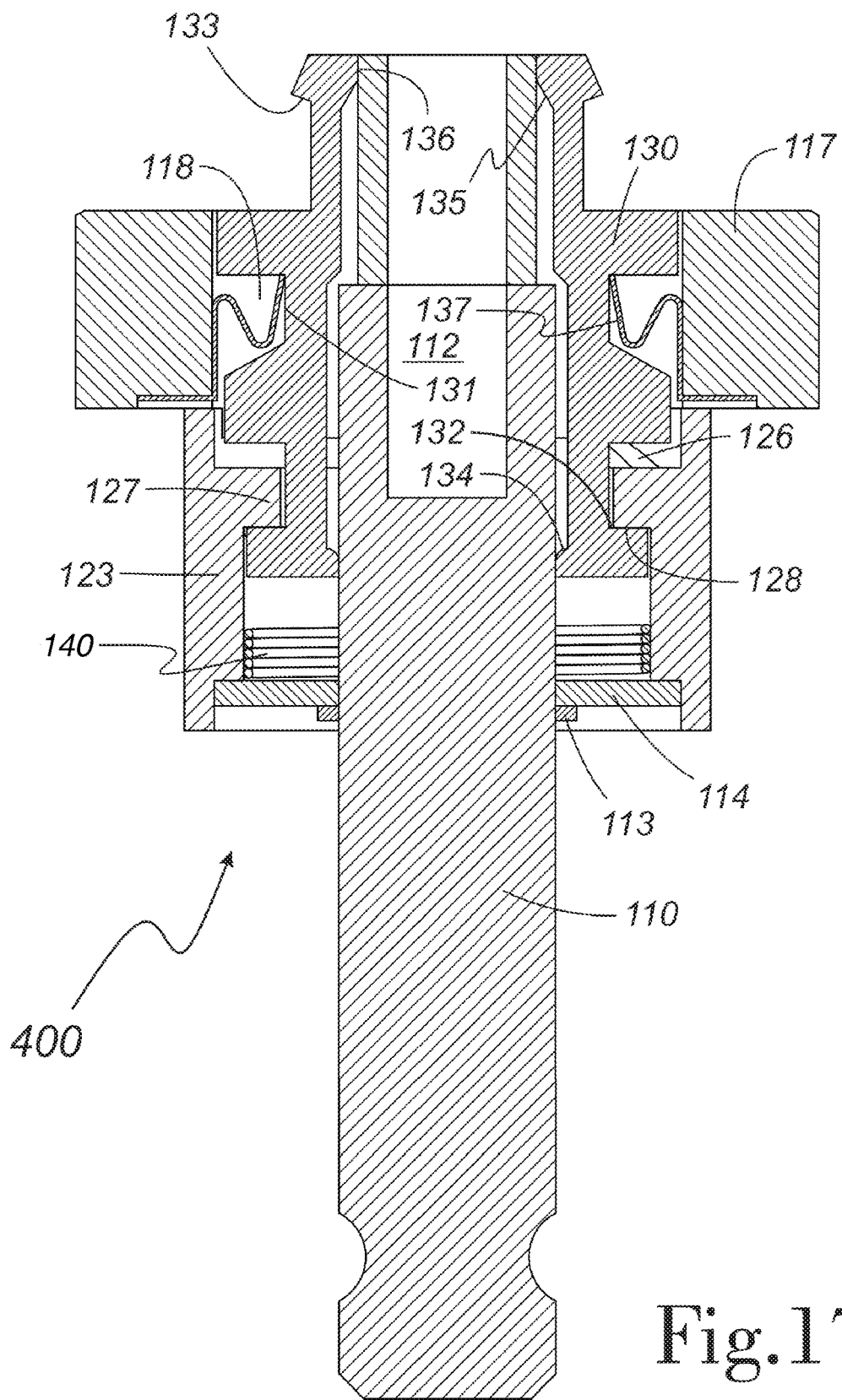
FIG. 17 is a sectional view of embodiment 400 of the present invention.

In general there are many other embodiments that could be derived from the disclosed elements and features. For example, embodiment 400 of the present invention, shown in FIGS. 16-19, utilizes a set of individual retainer arms as in embodiment 100 that comprise a feature substantially similar to interface 60' and are slid rearward as in embodiment 200 and locked into the engaged position via a rotational mechanism as in embodiment 300. In detail (FIG. 16-18) embodiment 400 includes a main shaft 110 where a circlip groove 111 and a pilot bit aperture 112 are all features of main shaft 110, and a circlip 113 is seated in groove 111 with a washer 114 positioned against circlip 113. An aperture 115 with a shape substantially similar to the exterior shape of shaft 110 and a spring catch 116 are all features of washer 114. An upper support 117 is fixed rigidly to shaft 110 and receives shaft 110 through aperture 120. The upper support 117 includes a set of retainer arm recesses 118, a set of recess edges 119, a locating hub 121 and a set of engagement pins 122. An outer sleeve 123 is secured between upper support 117 and washer 114 such that movement of outer sleeve 123 is substantially restricted to rotation. The upper support 117 includes a washer recess 124, and a hub recess 125 in sleeve 123 interacts with hub 121 to position sleeve 123 concentrically about shaft 110. A release ramp 126 is formed in sleeve 123, and a set of engagement keys 127 extend inwardly into the central bore of the sleeve 123. A wedge interface 128 and a spring recess 129 are provided on keys 127. A set of retainer arms 130 are positioned within and slidably interact within recesses 118, each arm 130 including a spring notch 131, and a bearing surface 132 that interacts with engagement keys 127 and release ramps 126 when the sleeve 123 is rotated, as detailed below. A catch 133 extends radially outwardly from the distal end of each arm 130, and a pivot protrusion 134 extends radially inwardly from the proximal end of each arm 130. An obliquely tapering surface 135 with a distal vertical wall portion 136 are all features of retainer arms 130, as best shown in FIG. 17. A torsion spring assembly 140 is provided, interacting with spring catch 116 to rotate sleeve 123 such that spring 140 is constantly urging engagement keys 127 against retainer arms 130. A set of retainer springs 137 is also provided, comprised of leaf springs configured such that one end is fixed to upper support 117 while the other interacts with spring notches 131 of retainer arms 130 such that springs 137 are constantly urging retainer arms 130 radially inward and forward.

Figure 18:
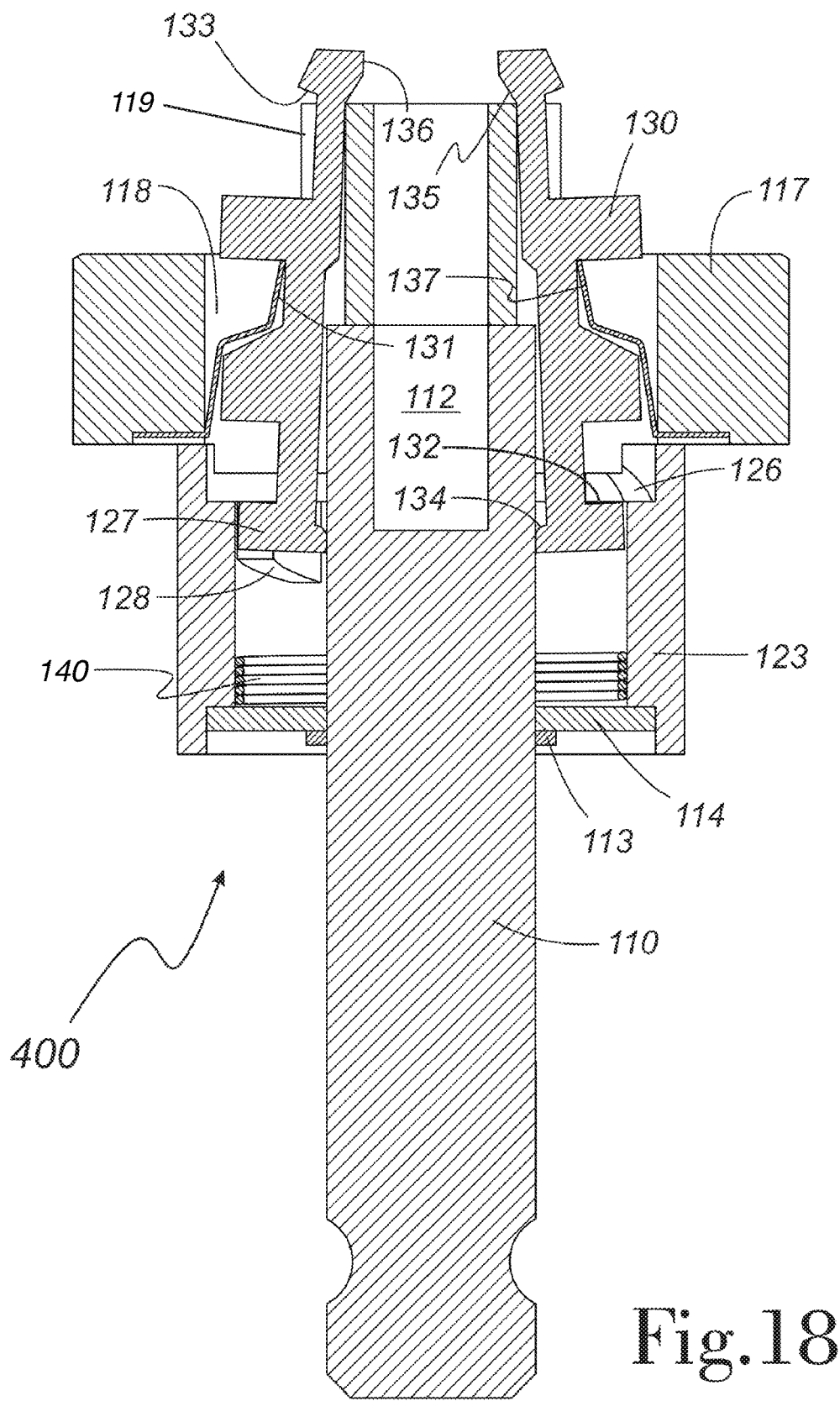
FIG. 18 is a sectional view of embodiment 400 of the present invention.

FIG. 17-18 illustrate embodiment 400 in the engaged and disengaged position, respectively. Now focusing on FIG. 17 embodiment 400 is in the engaged/starting position where retainer arms 130 are restrained from moving upward as spring 140 is urging engagement keys 127 against notch 132. In FIG. 18 outer sleeve 123 has been rotated to the point where engagement keys 127 are no longer engaged or in contact with notch 132. As a result spring 131 has urged retainer arms 130 into the forward position shown. Note that since spring 131 is urging retainer arms 130 both forward and radially inward, edge 119 will be substantially in contact with surfaces 135/136 during this forward movement. Still focusing on FIG. 18, in this position the user is able to mount the saw bit where similar to previous embodiments once the back of the saw bit is in contact with retainer arms 130, further downward movement will again align engagement keys 127 with notch 132, allowing spring 131 to return embodiment 400 to the position shown in FIG. 12. Similar to ramped surfaces 90 in embodiment 300, wedge interface 128 is an optional feature that serves to draw retainer arms 130 further downward after engagement of keys 127 with notch 132. The release ramps 126 are another optional feature that addresses the situation where due to fouling or friction between the pilot bit and wooden plug (both not shown), retainer arms 130 may become stuck in the engaged position. In this case the interaction of ramps 126 with notches 132 will raise arms 130 to the point where keys 127 are no longer aligned with surfaces 132, allowing the user to simply pull off the saw bit.

Figure 19:
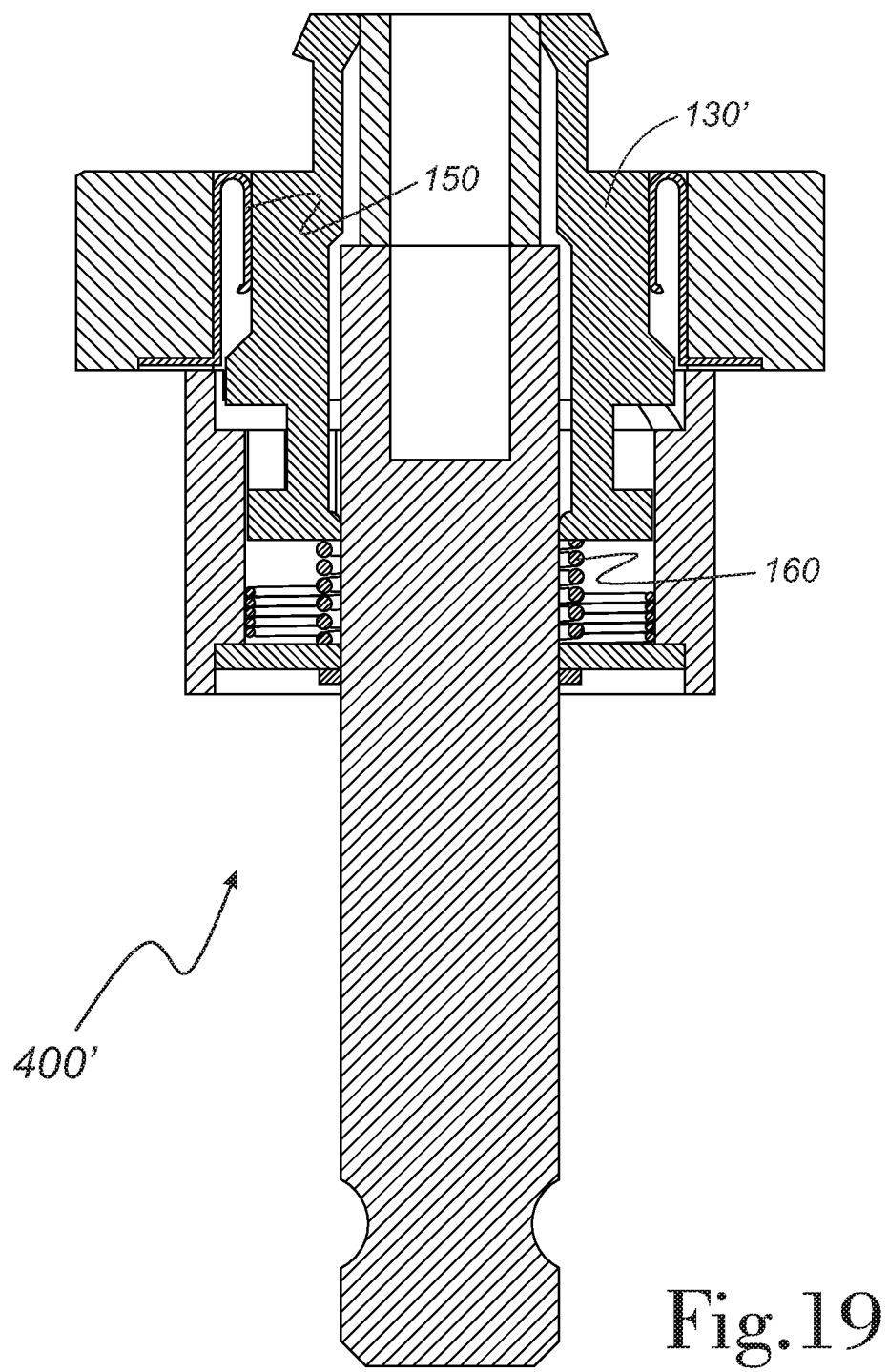
FIG. 19 is a sectional view of embodiment 400' of the present invention.
Figure 20:
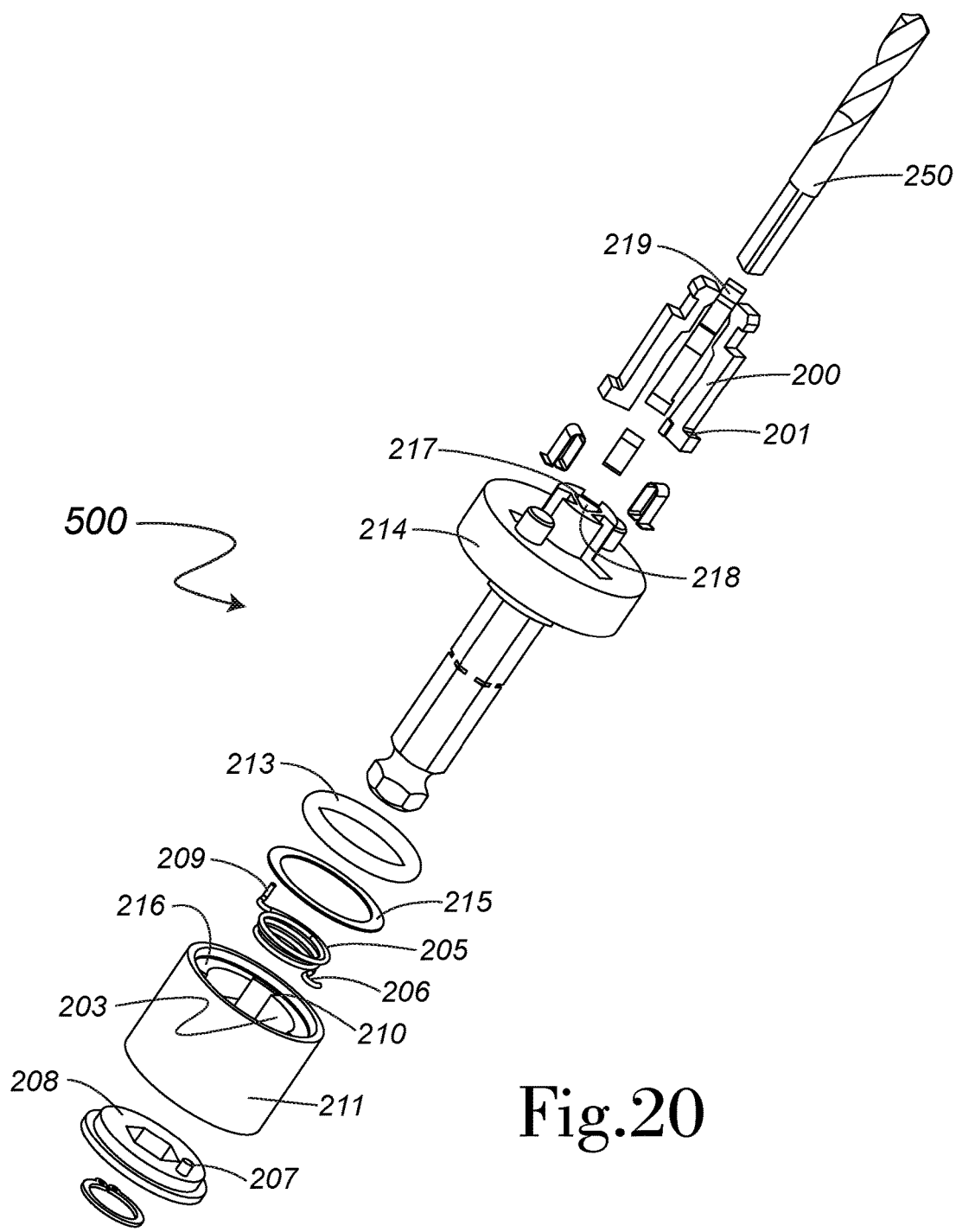
FIG. 20 is an exploded view of embodiment 500 of the present invention.
Figure 21:
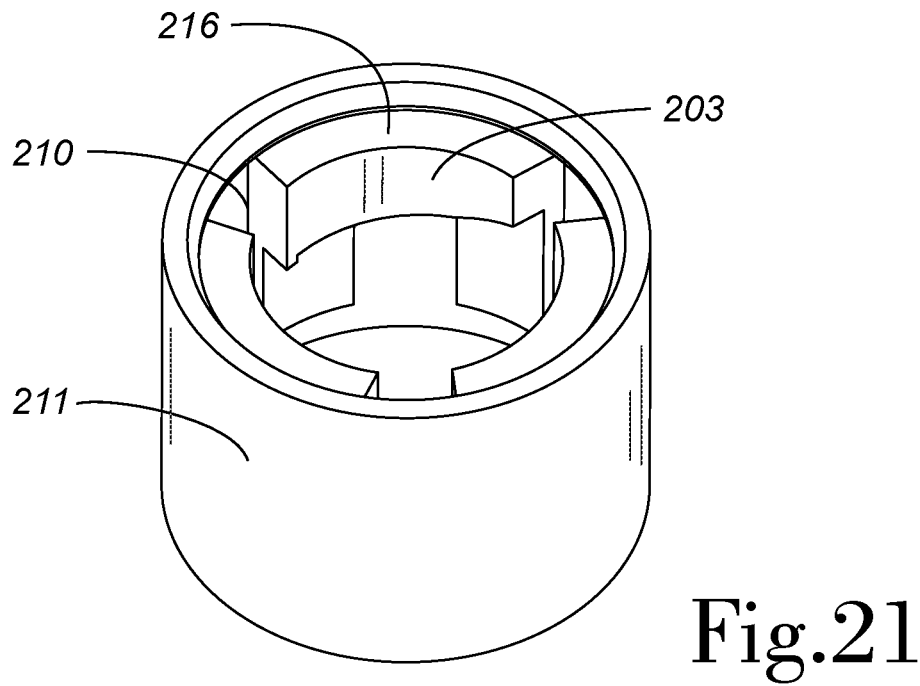
FIGS. 21 and 22 are enlarged perspective views of sleeve 211 of the present invention.
Figure 22:
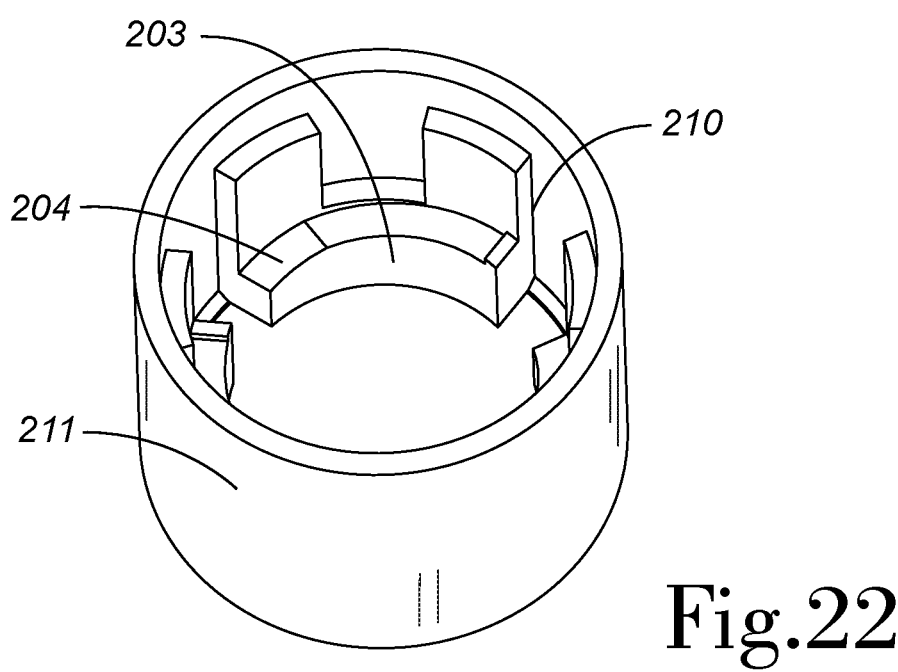

There are many other possible embodiments of the present invention. For example, springs 137 could be replaced with a set of springs as shown in FIG. 19 where springs 150 urge the retainer arms 130' radially inward and spring 160 urge retainer arms 130' upwardly. Another possible embodiment would be to reconfigure the retainer arms 130 such that they expanded a hog ring or washer to provide the bit retention means as opposed to the catches illustrated in previous embodiments. Yet another possible embodiment would be to reconfigure embodiment 400 such that engagement keys 127 moved radially inward into notches 132 (similar to embodiment 200) or conversely if notches 132 moved radially outward to engage keys 127. Still yet another possible embodiment would be to integrate a bit retention means with the mandrel's pair of engagement pins as opposed to the center spud. Finally, other possible embodiments would be the use of ball bearings, expanding washers, pins, etc., as a saw bit retention means. In particular, the use of ball bearings as a means of quick disconnect/connect retention is well known in the art. Also, it should be noted that the disclosed figures are used to illustrate the interoperability of the described elements. In actual production obvious changes would have to be made to allow for both manufacture and assembly.

In a further embodiment, shown in FIGS. 20-24, assembly 500 works in substantially the same way as embodiment 400, 400'. The minor differences being the following: the use of three retainer arms 200 as opposed to a pair of retainer arms 130 in previous embodiments, where retainer arms 200 no longer include notch 132 in embodiment 400, 400'. It should be noted that the number of retainer arms used is not a specific requirement of the present invention. For example, other embodiments could be comprised of 1, 2, 3, 4, 5, etc. retainer arms. The present invention only requires that it includes at least one retainer arm. Also note, the geometry defined by notch 132 in embodiment 400 is not a requirement of retainer arms 130. The only requirement is that the retainer arms of the present invention include a proximal surface of notch 132 such as bearing surface 201 in embodiment 500 that interacts with the underside of engagement keys 127, 203 or optionally wedged interfaces 204, similar to surfaces 128, to restrain retainer arms 130, 200 in the engaged position FIG. 17, 23. The other two remaining sides of notch 132 are optional. For example, if optional release ramp 126 in embodiment 400 was present, then the distal surface of notch 132 would be required.

Figure 23:
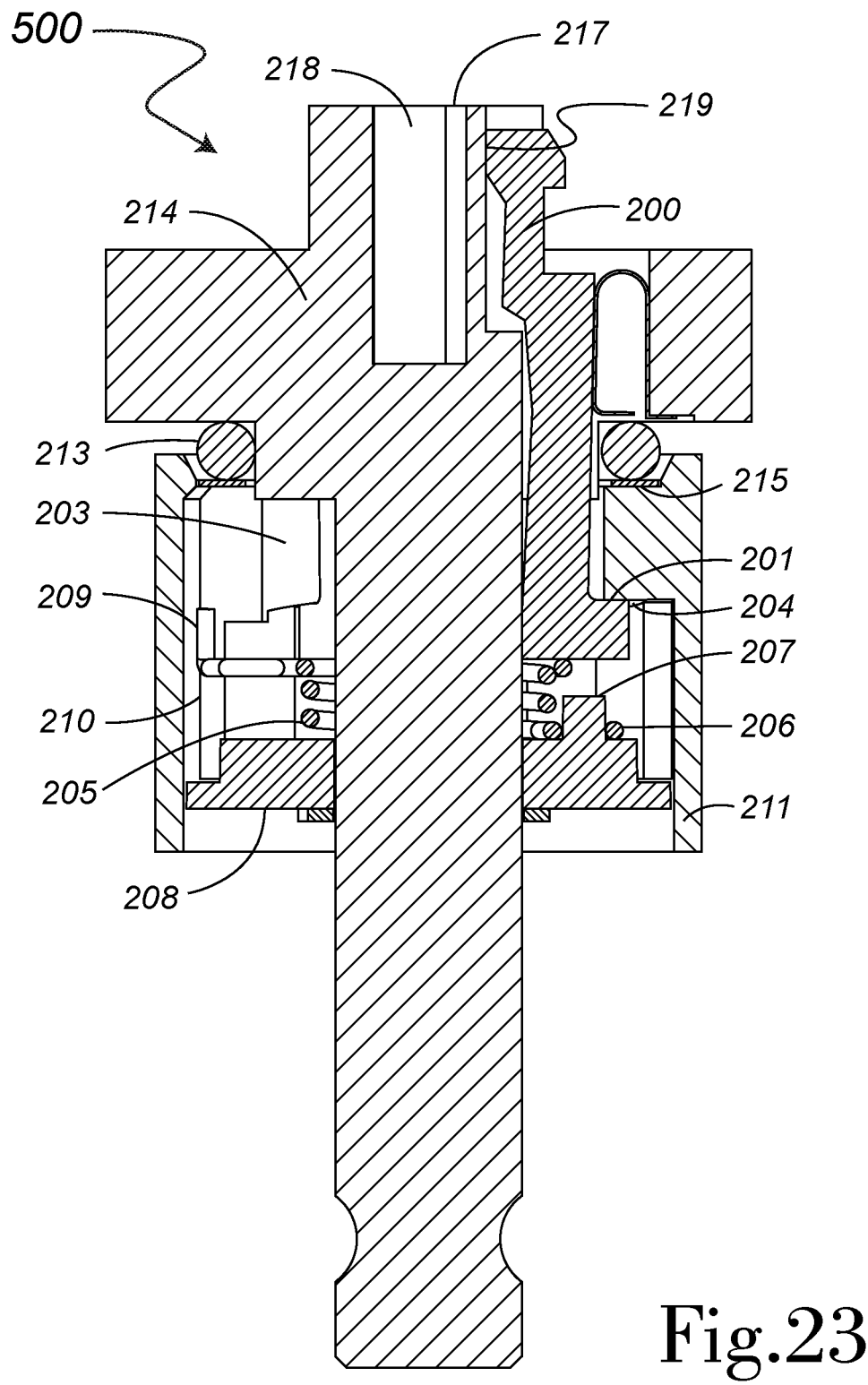
FIG. 23 is a sectional view of embodiment 500 of the present invention.
Figure 24:
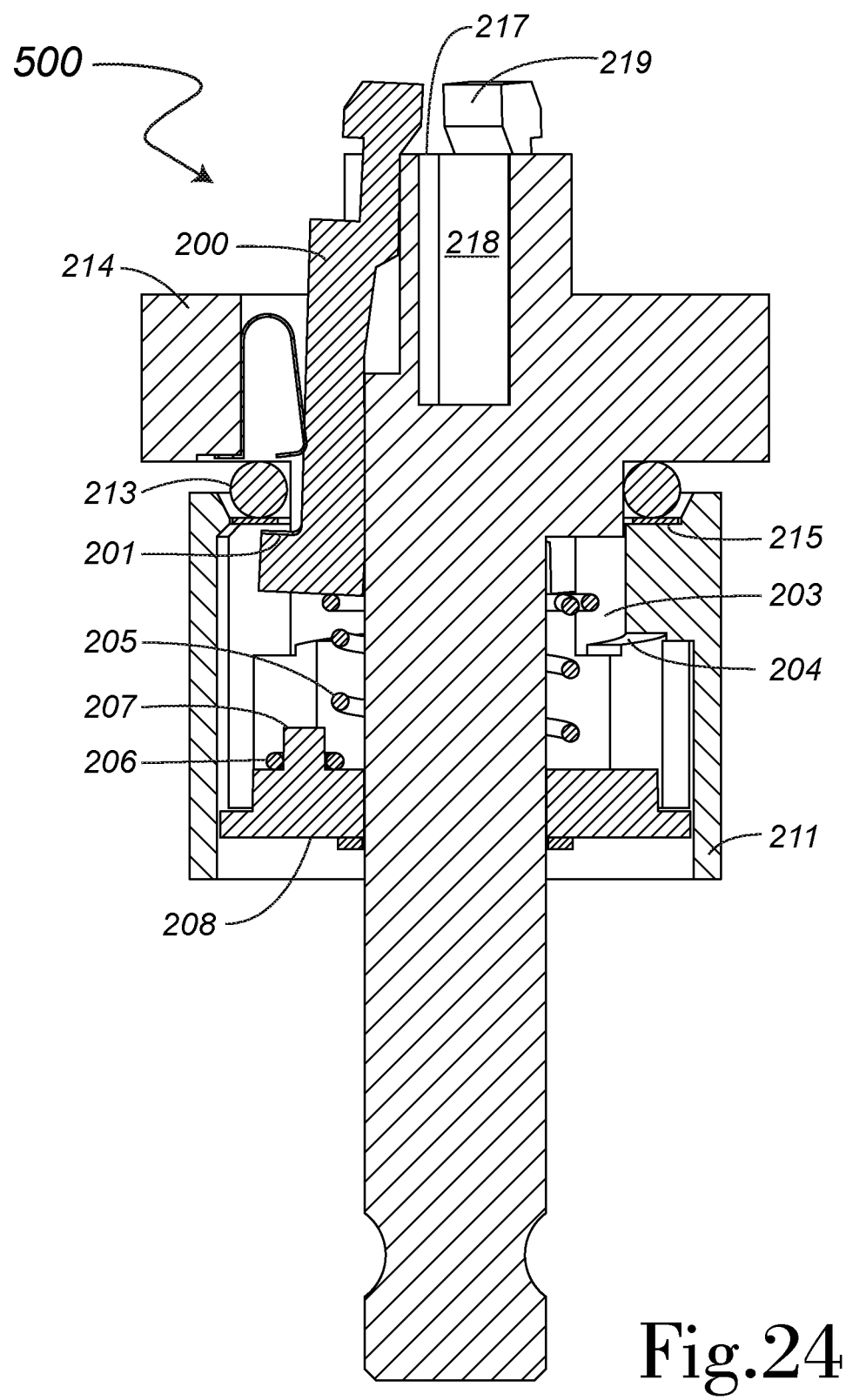
FIG. 24 is a sectional view of embodiment 500 of the present invention.

Another optional improvement includes the use of a single spring 205 to provide both the rotational and axial spring force previously provided by spring 140. In detail, spring 205 comprises hook 206 on the proximal end of spring 205 that engages spring catch 207 on washer 208 and pin feature 209 on the distal end that engages and slidably interacts with corner 210 as shown in FIG. 23. Due to this slidable interaction between corner 210 and pin feature 209, the distal end of spring 205 is able to move freely in the axial direction and provide a axial spring force to retainer arms 130 while also transferring a rotational spring force to corner 210 on outer sleeve 211. Again, note that the rotational and axial force components of spring 205 are optional. For example, the rotational force component of spring 205, 131 serves to automatically lock retainer arms 201, 130 in place when bearing surface 201 is moved proximally past the underside of keys 203 or wedge interface 204. However, this is a convenience feature as the user could manually rotate outer sleeve 211 when the above condition is met. Similarly, the axial component of spring 205 serves to automatically eject a hole saw bit and hold retainer arms 200 in the position shown in FIG. 24. This is also a convenience feature as the user may easily pull off the hole saw bit manually and there are many other ways to restrain retainer arms 200 in the position shown in FIG. 24. For example, magnets, detents, etc. may be used; if optional side springs 150 are used they would also assist in holding retainer arms 130 in the position shown in FIG. 24. In addition, holding or placing the retainer arms in the position in FIG. 24 could be done manually as well.

Another optional improvement in embodiment 500 is the use of a rubber o-ring 213 to provide a degree of compliance that will more easily allow the user to tighten outer sleeve 211 when any embodiment is comprised of wedged interfaces 204. In detail, o-ring 213 is located between proximal face of upper support 214 and wear washer 215 positioned against washer lands 216. As shown in FIG. 23, in this configuration any rotational tightening torque applied to outer sleeve 211 will force bearing surfaces 201 further up the ramps of wedge interface 204 which in turn will force/draw outer sleeve 211 towards upper support 214 compressing o-ring 213. This compression of o-ring 213 provides the optional compliance; such methods and systems are well known in the art. It should be noted that the present invention does not specifically require a rubber O-ring, any number of compliance members could provide the same function such as a spring, Bellville washer, elastomeric compounds of many different shapes, etc.

Yet another optional improvement in embodiment 500 is to reconfigure the shape of pilot bit aperture 112 in embodiment 400, 400' as illustrated in pilot bit aperture 217. In detail, pilot bit aperture 217 is comprised of a plurality of retainer faces 218 that are arranged substantially parallel to and preferably of substantially the same shape of surface 219 on retainer arms 200. For example, for a surface 219 that was substantially flat, retainer faces 218 would be substantially flat and parallel (in the engaged position FIG. 23) to surface 219. Also note, that while the shape of pilot bit aperture 217 is illustrated as substantially triangular, this is a result of embodiment 500 illustrated with three retainer arms 200 and is not a requirement. For example, if embodiment 500 comprised of four retainer arms 200 then the shape of pilot bit aperture 217 would be substantially square. The advantage of this configuration is the ability to use pilot bit 250 with a proximal end of substantially the same shape as pilot bit aperture 217. This will allow surface 219 to extend farther radially inward and therefore increase the total radially outward throw of the distal end of retainer arms 200 when moving from the disengaged position illustrated in FIG. 24 to the engaged position illustrated in FIG. 23.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A quick connect/disconnect mechanism for a rotary bit having a central mounting hole at a proximal end thereof, including:

a shaft assembly extending axially and having a proximal end adapted to be releasably secured in a rotary tool and a distal end having at least one recess extending therein;

at least one retainer arm received within said at least one recess in limited rotating fashion;

said retainer arm including a distal end having a catch adapted to engage the central mounting hole of the bit, and a proximal end;

a support ring received about said shaft assembly adjacent to said distal end thereof and defining therebetween at least one spring recess, and at least one return spring disposed in said spring recess and impinging on said at least one retainer arm to urge said catch to a first position in which it extends radially inwardly from said distal end of said shaft assembly;

a release sleeve secured concentrically about said shaft assembly and defining therebetween an interior space, said proximal end of said at least one retainer arm being disposed in said interior space, said at least one retainer arm including a bearing surface projecting radially outwardly therefrom;

said release sleeve including at least one engagement key extending radially inwardly into said interior space and disposed in proximity to a respective bearing surface of said at least one retainer arm, said release sleeve being secured to said shaft in rotatable fashion to rotate and impinge said at least one engagement key on said bearing surface of said at least one retainer arm to rotate said retainer arm and urge said proximal end of said retainer arm radially outwardly and cause said distal ends of said retainer arms to rotate radially inwardly to a second position and release the rotary bit.

2. The quick connect/disconnect mechanism for a rotary bit of claim 1, further including a helical spring secured about said shaft assembly, said helical spring having a proximal end secured to said shaft assembly and a distal end impinging on the proximal end of said at least one retainer arm to resiliently urge said at least one retainer arm toward said second position.

3. The quick connect/disconnect mechanism for a rotary bit of claim 2, further including a pin feature extending from said proximal end of said helical spring to impinge on said release sleeve and resiliently bias said release sleeve to rotate toward said first position.

4. The quick connect/disconnect mechanism for a rotary bit of claim 1, further including an annular elastomeric component secured about said shaft assembly to impinge on said release sleeve and said support ring.

5. The quick connect/disconnect mechanism for a rotary bit of claim 1, wherein said at least one engagement key includes a wedge surface disposed to impinge on a portion of said proximal end of said at least one retainer arm and restrain said at least one retainer arm in said first position.

6. The quick connect/disconnect mechanism for a rotary bit of claim 1, further including a trio of said retainer arms spaced in generally equal-angle relationship about the axis of said shaft assembly.

7. The quick connect/disconnect mechanism for a rotary bit of claim 6, further including a helical spring secured about said shaft assembly, said helical spring having a proximal end secured to said shaft assembly and a distal end impinging on the proximal ends of said trio of retainer arms to resiliently urge said retainer arms toward said second position.

8. The quick connect/disconnect mechanism for a rotary bit of claim 7, further including a trio of said engagement keys, each disposed to engage the proximal end of a respective one of said retainer arms.

9. The quick connect/disconnect mechanism for a rotary bit of claim 8, wherein said trio of engagement keys each include a wedge surface disposed to impinge on a portion of said proximal end of a respective retainer arm and restrain said retainer arm in said first position.

\* \* \* \* \*